(12) United States Patent
Maruyama et al.

(10) Patent No.: US 7,973,124 B2
(45) Date of Patent: Jul. 5, 2011

(54) METHOD FOR PRODUCING THERMOPLASTIC POLYESTER ELASTOMER, THERMOPLASTIC POLYESTER ELASTOMER COMPOSITION, AND THERMOPLASTIC POLYESTER ELASTOMER

(75) Inventors: Gaku Maruyama, Tsuruga (JP); Shoji Koketsu, Iwakuni (JP); Kenta Susuki, Tsuruga (JP); Katsuaki Kuze, Ohtsu (JP); Shigeo Ukyo, Ohtsu (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 64 days.

(21) Appl. No.: 12/158,231

(22) PCT Filed: Dec. 15, 2006

(86) PCT No.: PCT/JP2006/325015
§ 371 (c)(1),
(2), (4) Date: Mar. 25, 2009

(87) PCT Pub. No.: WO2007/072748
PCT Pub. Date: Jun. 28, 2007

(65) Prior Publication Data
US 2009/0203871 A1    Aug. 13, 2009

(30) Foreign Application Priority Data

Dec. 19, 2005 (JP) ................................ 2005-364775
Jan. 23, 2006 (JP) ................................ 2006-013806
Jan. 23, 2006 (JP) ................................ 2006-013807
Nov. 21, 2006 (JP) ................................ 2006-313804

(51) Int. Cl.
*C08G 64/00* (2006.01)
*C08G 63/02* (2006.01)

(52) U.S. Cl. .................... 528/303; 528/306; 528/308
(58) Field of Classification Search .............. 528/303, 528/306, 308
See application file for complete search history.

(56) References Cited

U.S. PATENT DOCUMENTS

| | | | | |
|---|---|---|---|---|
| 5,191,057 A | * | 3/1993 | Niki et al. | 528/190 |
| 5,235,024 A | * | 8/1993 | Niki et al. | 528/190 |
| 5,703,196 A | | 12/1997 | Funakoshi et al. | |
| 5,750,626 A | * | 5/1998 | Shimizu et al. | 525/151 |
| 5,869,574 A | * | 2/1999 | Shimizu et al. | 525/151 |
| 5,914,386 A | * | 6/1999 | Berendse et al. | 528/272 |
| 6,179,008 B1 | * | 1/2001 | Kawazura et al. | 138/125 |

FOREIGN PATENT DOCUMENTS

| | | |
|---|---|---|
| EP | 0 893 463 A1 | 1/1999 |
| JP | 62-292833 A | 12/1987 |
| JP | 4-222822 A | 8/1992 |
| JP | 5-295094 A | 11/1993 |
| JP | 06-306262 A | 11/1994 |
| JP | 7-39480 B2 | 5/1995 |
| JP | 8-143656 A | 6/1996 |
| JP | 8-283553 A | 10/1996 |
| JP | 10-017657 A | 1/1998 |
| JP | 10-182782 A | 7/1998 |
| JP | 10-195187 A | 7/1998 |
| JP | 2001-206939 A | 7/2001 |
| JP | 2001-240663 A | 9/2001 |
| JP | 2003-192778 A | 7/2003 |
| WO | 9527749 A1 | 10/1995 |

OTHER PUBLICATIONS

International Search Report of PCT/JP2006/325015, date of mailing Mar. 13, 2007.
International Preliminary Report on Patentability of International patent application No. PCT/JP2006/325015 mailed Jun. 24, 2008, with Forms PCT/IB/373 and PCT/ISA/237.
Japanese Office Action dated Oct. 2, 2008, issued in corresponding Japanese Patent Application No. 2007551061.

* cited by examiner

*Primary Examiner* — Terressa M Boykin
(74) *Attorney, Agent, or Firm* — Westerman, Hattori, Daniels & Adrian, LLP

(57) ABSTRACT

The present invention provides a thermoplastic polyester elastomer excellent in heat resistance, heat-aging resistance, water resistance, light resistance, low-temperature property and the like, and further excellent in block order-retaining ability, the thermoplastic polyester elastomer comprising a hard segment which comprises polyester constituted with aromatic dicarboxylic acid and aliphatic or alicyclic diol and a soft segment which comprises mainly aliphatic polycarbonate, wherein the hard segment and the soft segment being connected, and wherein when melting points of the thermoplastic polyester elastomer are obtained by measuring on a differential scanning calorimeter in three cycles in which a temperature is raised from room temperature to 300° C. at a heating rate of 20° C./min., maintained at 300° C. for 3 minutes and lowered to room temperature at a cooling rate of 100° C./min., a melting point difference (Tm1–Tm3) between a melting point obtained in the first cycle (Tm1) and a melting point obtained in the third cycle (Tm3) is 0-50° C., and a tensile strength at break is 15-100 MPa.

16 Claims, 2 Drawing Sheets

METHOD FOR PRODUCING THERMOPLASTIC POLYESTER ELASTOMER, THERMOPLASTIC POLYESTER ELASTOMER COMPOSITION, AND THERMOPLASTIC POLYESTER ELASTOMER

TECHNICAL FIELD

The present invention relates to a method for producing a thermoplastic polyester elastomer and its composition, and a thermoplastic polyester elastomer. Specifically, the present invention relates to a thermoplastic polyester elastomer and its composition which are excellent in heat resistance, light resistance, heat-aging resistance, water resistance (also referred to as "water-aging resistance"), low-temperature properties and the like, especially a thermoplastic polyester elastomer and its composition which may be used in various molding materials including fibers, films, and sheets. More preferably, the present invention relates to a thermoplastic polyester elastomer and its composition which are suitable for molding materials such as elastic threads and boots, gears, tubes, packings and the like, and are useful in applications in which heat-aging resistance, water resistance and low-temperature properties are demanded, for example, in automobile, home electronics parts and the like, for example, in applications for joint boots, wire coating materials and the like, as well as a method for producing such thermoplastic polyester elastomer.

BACKGROUND OF THE INVENTION

As a thermoplastic polyester elastomer, elastomers which comprise a crystalline polyester such as polybutylene terephthalate (PBT), and polybutylene naphthalate (PBN) as a hard segment and a polyoxyalkylene glycol such as polytetramethylene glycol (PTMG) and the like and/or polyester such as polycaprolactone (PCL), polybutylene adipate (PBA) and the like as a soft segment are conventionally known and practically used (See, for example, Patent Documents 1 and 2).

However, it is known in the art that polyester polyether-type elastomers comprising a polyoxyalkylene glycol as a soft segment are excellent in water resistance and low-temperature properties but poor in heat-aging resistance and that polyester polyester-type elastomers comprising polyester as a soft segment are excellent in heat-aging resistance but poor in water resistance and low-temperature properties.

In order to solve the above-mentioned shortcomings, polyester polycarbonate-type elastomers comprising polycarbonate as a soft segment have been proposed (See, for example, Patent Documents 3-8).

Although the polyester polycarbonate-type elastomers disclosed in these Patent Documents can solve the above-mentioned problems, a problem remains that obtained polyester polycarbonate-type elastomers are poor in block order and an ability to retain block order when the polyester polycarbonate-type elastomers are kept in a molten state (hereinafter, simply referred to as "block order-retaining ability") because a molecular weight of polycarbonate diol used as a raw material is low, and others.

For example, low block order causes a problem that a melting point of a polyester polycarbonate-type elastomer becomes lower. Thus, in applications, for example, where joint boots, wire coating materials are used under high-temperature circumstances such as on the periphery of automobile engines, low heat resistance may be problem. Patent Documents 4, 7 and 8 disclose that a melting point can be raised by introducing a naphthalate backbone as a polyester component. However, since introducing a naphthalate backbone is expensive, it is desired to raise a melting point by introducing a polyester component having an inexpensive terephthalate backbone. In addition, for a polyester polycarbonate-type elastomer comprising a polyester component having a naphthalate backbone, it is desired that its melting point is further raised in order to compensate cost increasing.

In addition, recently it is demanded to reuse irregular products and recycle merchandise from viewpoints of environmental burden and cost reduction. High block order-retaining ability is necessary for satisfying the above demand. Based on the background, it is strongly demanded to develop a polyester polycarbonate-type elastomer having a high block order and excellent block order-retaining ability.

On the other hand, Patent Documents 7 and 8 disclose methods for producing polyester elastomers by reacting a polyester component constituting a hard segment and a polycarbonate diol component constituting a soft segment in a molten state to prepare a block polymer and by increasing its molecular weight with a chain extending agent. This method for producing is effective to increase a molecular weight of the block polymer. However, since the block order and block order-retaining ability are greatly affected by a reaction process mainly for preparing the block polymer, it is difficult to improve the block order and block order-retaining ability by a method which prepares the block polymer followed by increasing its molecular weight with a chain extending agent. Accordingly, the prior art have not provided a thermoplastic polyester elastomer having the above preferred characteristics. Therefore, it is strongly desired to establish a method for producing a polyester polycarbonate-type elastomer for economically producing a thermoplastic polyester elastomer having the above preferred characteristics.

[Patent Document 1] JP H10-17657A
[Patent Document 2] JP 2003-192778A
[Patent Document 3] JP H07-39480A
[Patent Document 4] JP H05-295094A
[Patent Document 5] JP H06-306262A
[Patent Document 6] JP H10-182782A
[Patent Document 7] JP 2001-206939A
[Patent Document 8] JP 2001-240663A

DISCLOSURE OF THE INVENTION

Figure 1:
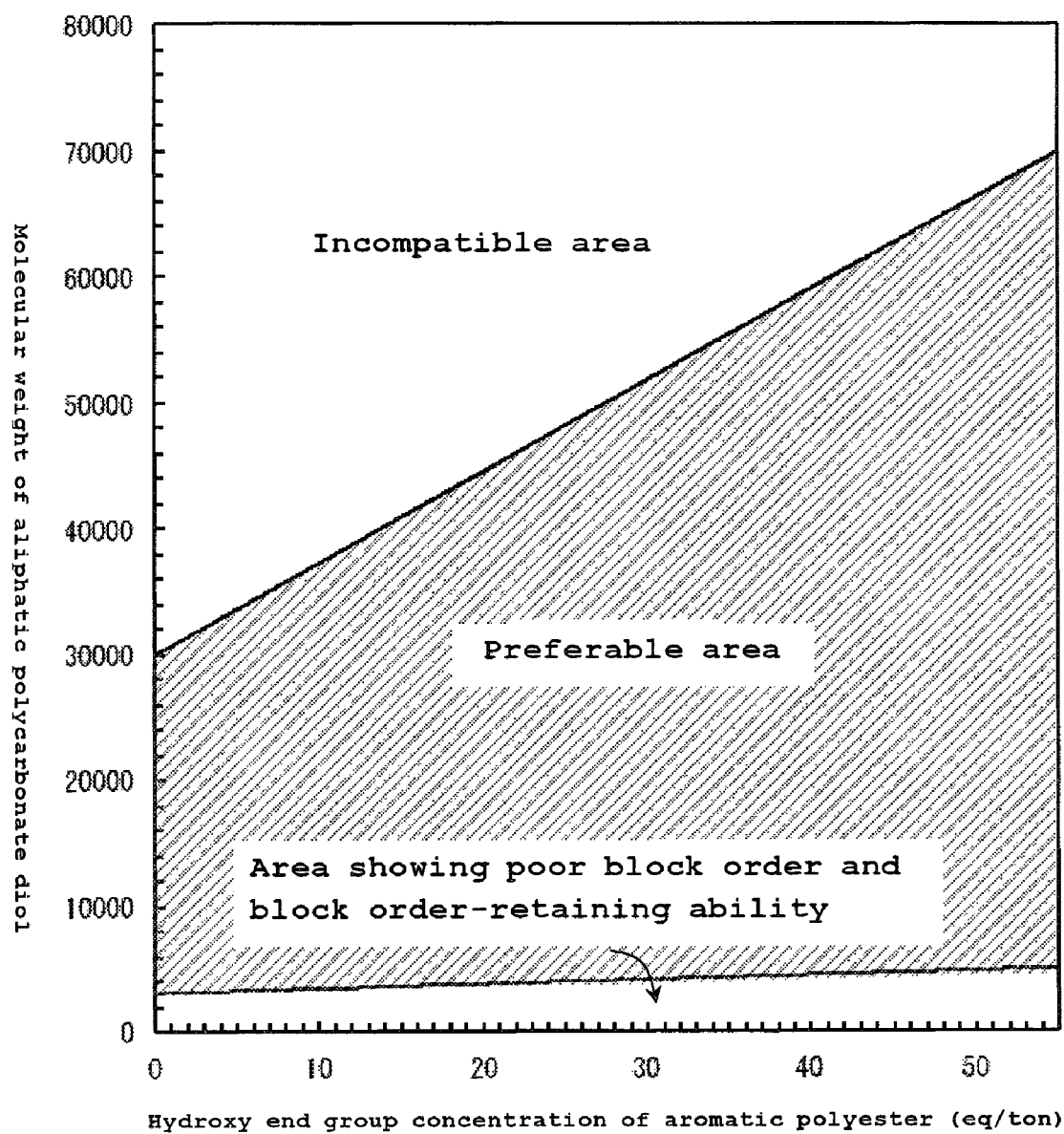
FIG. 1 A graphical representation showing a relationship between a hydroxyl end group concentration of the raw material polyester of the present invention and a molecular weight of the aliphatic polycarbonate diol suitable for the hydroxyl end group concentration.

Problem to be Solved by the Invention

With considering the problems which conventional thermoplastic polyester elastomers have, an object of the present invention is to provide a thermoplastic polyester elastomer excellent in all of heat resistance, heat-aging resistance, water resistance (also referred to as "water-aging resistance"), light resistance, low-temperature properties and the like as well as excellent in block order-retaining ability.

Another object of the present invention is to provide a thermoplastic polyester elastomer composition more excellent in all of heat resistance, heat-aging resistance and water resistance as well as excellent in block order-retaining ability at a time of molding and molding properties such as an extrusion molding property and a property hard to draw down at a time of blow molding.

Further object of the present invention is to provide a method for economically producing a thermoplastic polyester elastomer excellent in all of heat resistance, heat-aging resistance, water resistance, light resistance and low-temperature properties and the like and excellent in block order-retaining ability.

Means for Solving the Problem

The present inventions accomplishing the above objects are as follows:

[1] A thermoplastic polyester elastomer comprising a hard segment which comprises polyester constituted with aromatic dicarboxylic acid and aliphatic or alicyclic diol and a soft segment which comprises mainly aliphatic polycarbonate, wherein the hard segment and the soft segment being connected, and wherein when melting points of the thermoplastic polyester elastomer are obtained by measuring on a differential scanning calorimeter in three cycles in which a temperature is raised from room temperature to 300° C. at a heating rate of 20° C./min., maintained at 300° C. for 3 minutes and lowered to room temperature at a cooling rate of 100° C./min., a melting point difference (Tm1–Tm3) between a melting point obtained in the first cycle (Tm1) and a melting point obtained in the third cycle (Tm3) is 0-50° C., and a tensile strength at break is 15-100 MPa.

[2] The thermoplastic polyester elastomer according to the above [1], wherein the hard segment comprises polybutylene terephthalate units and the melting points of the thermoplastic polyester elastomer are 200-225° C.

[3] The thermoplastic polyester elastomer according to the above [1], wherein the hard segment comprises polybutylene naphthalate units and the melting points of the thermoplastic polyester elastomer are 215-240° C.

[4] The thermoplastic polyester elastomer according to any one of the above [1]-[3], wherein when an average chain length of the hard segment is defined as x and an average chain length of the soft segment is defined as y by calculating with nuclear magnetic resonance (NMR), the average chain length of the hard segment (x) is 5-20 and a block order (B) calculated with the following equation (1):

$$B=1/x+1/y \qquad (1)$$

is 0.11-0.45.

[5] The thermoplastic polyester elastomer according to any one of the above [1]-[4], which is prepared by reacting the polyester constituted with aromatic dicarboxylic acid and aliphatic or alicyclic diol and aliphatic polycarbonate diol having a molecular weight of 5000-80000 in a molten state.

[6] A thermoplastic polyester elastomer composition comprising 100 parts by weight of a thermoplastic polyester elastomer comprising a hard segment which comprises polyester constituted with aromatic dicarboxylic acid and aliphatic or alicyclic diol and a soft segment which comprises mainly aliphatic polycarbonate, wherein the hard segment and the soft segment being connected, and wherein when melting points of the thermoplastic polyester elastomer are obtained by measuring on a differential scanning calorimeter in three cycles in which a temperature is raised from room temperature to 300° C. at a heating rate of 20° C./min., maintained at 300° C. for 3 minutes and lowered to room temperature at a cooling rate of 100° C./min., a melting point difference (Tm1–Tm3) between a melting point obtained in the first cycle (Tm1) and a melting point obtained in the third cycle (Tm3) is 0-50° C., and a tensile strength at break is 15-100 MPa and 0.01-20 parts by weight of a compound having one or more of groups reactive to the thermoplastic polyester elastomer.

[7] The thermoplastic polyester elastomer composition according to the above [6], wherein the hard segment in the thermoplastic polyester elastomer comprises polybutylene terephthalate units and the melting points of the thermoplastic polyester elastomer are 200-225° C.

[8] The thermoplastic polyester elastomer composition according to the above [6], wherein the hard segment in the thermoplastic polyester elastomer comprises polybutylene naphthalate units and the melting points of the thermoplastic polyester elastomer are 215-240° C.

[9] The thermoplastic polyester elastomer composition according to any one of the above [6]-[8], wherein when an average chain length of the hard segment is defined as x and an average chain length of the soft segment is defined as y by calculating with nuclear magnetic resonance (NMR) the average chain length of the hard segment in the thermoplastic polyester elastomer (x) is 5-20 and a block order (B) calculated with the following equation (1):

$$B=1/x+1/y \qquad (1)$$

is 0.11-0.45.

[10] The thermoplastic polyester elastomer composition according to any one of the above [6]-[9], wherein the thermoplastic polyester elastomer is prepared by reacting the polyester constituted with aromatic dicarboxylic acid and aliphatic or alicyclic diol and aliphatic polycarbonate diol having a molecular weight of 5000-80000 in a molten state.

[11] A molded product comprising the thermoplastic polyester elastomer composition according to any one of the above [6]-[10].

[12] A method for producing a thermoplastic polyester elastomer composition comprising 100 parts by weight of a thermoplastic polyester elastomer comprising a hard segment which comprises polyester constituted with aromatic dicarboxylic acid and aliphatic or alicyclic diol and a soft segment which comprises mainly aliphatic polycarbonate, wherein the hard segment and the soft segment being connected, wherein an aliphatic polycarbonate diol whose molecular weight has been previously increased with a chain extending agent is used.

[13] The method for producing a thermoplastic polyester elastomer according to the above [12], wherein the aliphatic polycarbonate diol whose molecular weight has been previously increased has a number-average molecular weight of 5000-80000.

[14] The method for producing a thermoplastic polyester elastomer according to the above [12] or [13], which comprises reacting the polyester constituted with aromatic dicarboxylic acid and aliphatic or alicyclic diol and the aliphatic polycarbonate diol whose molecular weight has been previously increased in a molten state.

[15] A method for producing a thermoplastic polyester elastomer composition comprising 100 parts by weight of a thermoplastic polyester elastomer comprising a hard segment which comprises polyester constituted with aromatic dicarboxylic acid and aliphatic or alicyclic diol and a soft segment which comprises mainly aliphatic polycarbonate, wherein the hard segment and the soft segment being connected, which comprises reacting in a molten state polyester constituted with aromatic dicarboxylic acid and aliphatic or alicyclic diol which has a hydroxyl end group concentration of 0-55 eq/ton and aliphatic polycarbonate diol having a molecular weight in the following range:

when the lower limit of the molecular weight of the aliphatic polycarbonate diol is set to be equal to or higher than molecular weights on a line connecting a point of 3000 at a hydroxyl end group concentration of 0 eq/ton for polyester constituted with aromatic dicarboxylic acid and aliphatic or alicyclic diol and a point of 5000 at a hydroxyl end group concentration of 55 eq/ton for polyester constituted with aromatic dicarboxylic acid and aliphatic or alicyclic diol; and the upper limit of the molecular weight of the aliphatic polycarbonate diol is set to be equal to or lower than molecular weights on a line connecting a point of 30000 at a hydroxyl end group concentration of 0 eq/ton for polyester constituted with aromatic dicarboxylic acid and aliphatic or alicyclic diol and a point of 70000 at a hydroxyl end group concentration of 55 eq/ton for polyester constituted with aromatic dicarboxylic acid and aliphatic or alicyclic diol, the molecular weight of the aliphatic polycarbonate is on or between the two lines.

[16] The method for producing a thermoplastic polyester elastomer according to the above [15], wherein the molecular weight of the aliphatic polycarbonate diol is adjusted by previously increasing with a chain extending agent.

EFFECT OF THE INVENTION

The thermoplastic polyester elastomer of the present invention and its composition have good heat resistance and have improved block order and block order-retaining ability while remaining characteristics of polyester polycarbonate-type elastomers in which heat-aging resistance, water resistance, low-temperature properties and the like are excellent. Since the block order is high, reduction in heat resistance induced by lowering a melting point is suppressed and, mechanical properties such as hardness, tensile strength, elasticity and the like are enhanced. In addition, since fluctuation in the block order at a time of molding is suppressed due to improved block order-retaining ability, uniformity of product quality can be enhanced. Further, since recycle properties are enhanced due to the above characteristics, environment burden and cost may be reduced. Therefore, as described above, the thermoplastic polyester elastomer of the present invention may be used in various molding materials including fibers, films, sheets and the like due to the above mentioned excellent characteristics and advantages. Moreover, it is suitable for molding materials such as elastic threads and boots, gears, tubes, packings, and is useful, for example, in applications for automobile, home electronics parts and the like in which heat-aging resistance, water resistance and low-temperature properties are demanded, and specifically, in applications for joint boots, wire coating materials and the like. Especially, it may be preferably used as raw materials for parts which are demanded to have high heat resistance such as joint boots, wire coating materials used on the periphery of automobile engines.

In addition, the method for producing a thermoplastic polyester elastomer of the present invention has an advantage that high quality thermoplastic polyester elastomers having the above mentioned characteristics can be economically and stably produced in a simple way.

THE BEST MODE FOR CARRYING OUT THE INVENTION

The thermoplastic polyester elastomer of the present invention and its composition will be explained below in detail.

In the thermoplastic polyester elastomer of the present invention, common aromatic dicarboxylic acids may be widely used as aromatic dicarboxylic acid constituting a hard segment of polyester. The main aromatic dicarboxylic acid is not especially limited but terephthalic acid or naphthalene dicarboxylic acid is desirable. Other acid components include aromatic dicarboxylic acid such as diphenyldicarboxylic acid, isophthalic acid, 5-sodiumsulfoisophthalic acid and the like; alicyclic dicarboxylic acid such as cyclohexanedicarboxylic acid, tetrahydrophthalic anhydride and the like; aliphatic dicarboxylic acid such as succinic acid, glutaric acid, adipinic acid, azelaic acid, sebacic acid, dodecanedioic acid, dimer acid, hydrogenated dimer acid and the like; and others. These components are used in a range where they do not greatly lower a melting point of resin and their amount is less than 30 mol %, preferably less than 20 mol % with respect to the amount of the whole acid components.

Further, in the thermoplastic polyester elastomer of the present invention, common aliphatic or alicyclic diols may be widely used as aliphatic or alicyclic diol constituting a hard segment of polyester. They are not especially limited but mainly alkylene glycols having a carbon number of 2-8 are desirable. Specifically, ethylene glycol, 1,3-propylene glycol, 1,4-butanediol, 1,6-hexanediol, 1,4-cyclohexanedimethanol and the like are included. Most preferable are 1,4-butanediol and 1,4-cyclohexanedimethanol.

From viewpoints of physical properties, formability and cost performance, those comprising butylene terephthalate units or butylene naphthalate units are more preferable as the above components constituting a hard segment of polyester. Additionally, regarding naphthalate units, a 2,6-isomer is preferable.

Further, in the thermoplastic polyester elastomer of the present invention, aromatic polyesters preferable for a hard segment of polyester may be prepared according to conventional method for manufacturing polyesters. In addition, it is desirable that those polyesters have a number-average molecular weight of 10000-40000.

Further, in the thermoplastic polyester elastomer of the present invention, it is preferable that aliphatic polycarbonate constituting a soft segment is those constituted with mainly aliphatic diol residues having a carbon number of 2-12 and carbonate bonds. These aliphatic diol residues include, for example, residues of ethylene glycol, 1,3-propylene glycol, 1,4-butanediol, 1,5-pentanediol, 1,6-hexanediol, 1,8-octanediol, 2,2-dimethyl 1,3-propanediol, 3-methyl-1,5-pentanediol, 2,4-diethyl 1,5-pentanediol, 1,9-nonanediol, 2-methyl-1,8-octanediol and the like. Especially, from viewpoints of softness and low-temperature properties of obtained thermoplastic polyester elastomers, aliphatic diol residues having a carbon number of 5-12 are preferable. These components may be used alone or optionally in a combination of two or more of them based on the situations explained below.

It is preferable that the aliphatic polycarbonate diol constituting a soft segment in the thermoplastic polyester elastomer of the present invention and having a good low-temperature property have a low melting point (e.g., 70° C. or lower) and a low glass transition point. Generally, since aliphatic polycarbonate diols having 1,6-hexanediol residues constituting a soft segment in a thermoplastic polyester elastomer have a low glass transition point around −60° C. and a melting point around 50° C., their low-temperature properties are good.

Furthermore, since aliphatic polycarbonate diols prepared by copolymerizing the above aliphatic polycarbonate diols with an appropriate amount of, for example, 3-methyl-1,5-pentanediol have a slightly higher glass transition point comparing to that of the original aliphatic polycarbonate diols but have a lower melting point or become amorphous, they are aliphatic polycarbonate diols having good low-temperature properties. In addition, since an aliphatic polycarbonate diol constituted with 1,9-nonanediol and 2-methyl-1,8-octanediol has sufficiently low melting point around 30° C. and a sufficiently low glass transition point around −70° C., it is an aliphatic polycarbonate diol having good low-temperature properties.

The above aliphatic polycarbonate diols are not necessarily constituted with only polycarbonate components, and may be prepared by copolymerizing with a small amount of other glycol, dicarboxylic acid, ester compound, ether compound and the like. Copolymer components include, for example, glycols such as diol dimers, hydrogenated diol dimers, their modifications and the like; dicarboxylic acids such as dimer acids, hydrogenated dimer acids and the like; polyesters or oligoesters constituted with aliphatic, aromatic, or alicyclic dicarboxylic acids and glycols; polyesters or oligoesters constituted with ε-caprolactone and the like; polyalkylene glycols or oligoalkylene glycols such as polytetramethylene glycol, polyoxyethylene glycol and the like; and others.

The above copolymer components may be used in an amount in which substantially they do not destroy an effect of the aliphatic polycarbonate segments. Specifically, such an amount is 40 parts by weight of or lower, preferably 30 parts by weight of or lower, more preferably 20 parts by weight of or lower with respect to 100 parts by weight of the aliphatic polycarbonate segments. When the amount of the copolymer components are too much, obtained thermoplastic polyester elastomers are poor in heat-aging resistance and water resistance.

The thermoplastic polyester elastomer of the present invention may contain copolymer components such as polyalkylene glycols such as polyethylene glycol, polyoxytetramethylene glycol and the like; polyesters such as polycaprolactone, polybutylene adipate and the like; and others as a soft segment, as far as they do not destroy the effect of the present invention. The amount of the copolymer components is usually 40 parts by weight of or lower, preferably 30 parts by weight of or lower, more preferably 20 parts by weight of or lower with respect to 100 parts by weight of the soft segments.

In the thermoplastic polyester elastomer of the present invention, a ratio between parts by weight of the polyester constituting a hard segment, the aliphatic polycarbonate and copolymer components constituting the soft segment is usually hard segment:soft segment=30:70-95:5, preferably 40:60-90:10, more preferably 45:55-87:13, most preferably 50:50-85:15.

The thermoplastic polyester elastomer of the present invention comprises a hard segment which comprises polyester constituted with aromatic dicarboxylic acid and aliphatic or alicyclic diol and a soft segment which comprises mainly aliphatic polycarbonate, wherein the hard segment and the soft segment being connected. In this text, a phrase "the hard segment and the soft segment being connected" does not indicate that hard segment-constituting units and soft segment-constituting units are connected via chain extending agents such as isocyanate compounds and the like, and it is preferable that those units are directly connected with ester bonds or carbonate bonds.

For example, it is preferable that it is prepared by repeatingly transesterifying and depolymerizing polyester constituting hard segment and polycarbonate constituting a soft segment and optionally various copolymer components in a molten state in predetermined period (hereinafter, also referred to as a "block polymerization").

The above block polymerization is carried out preferably in a temperature range from a melting point of polyester constituting a hard segment from a temperature of the melting point+30° C. In this reaction, the active catalyst concentration in the system may be arbitrarily determined depending on a temperature for the reaction. That is, at higher reaction temperature, it is desirable that the active catalyst concentration in the system is low because transesterification and depolymerization rapidly proceed. On the other hand, at lower reaction temperatures, it is desirable that some concentration of active catalysts exist.

As catalysts, usual catalysts may be used, for example on or two or more from titanium compounds such as titanium tetrabutoxide, potassium oxalate titanate and the like; and tin compounds such as dibutyltin oxide, monohydroxybutyltin oxide and the like. These catalysts may be previously contained in polyester or polycarbonate, in this case, further addition of catalyst is not required. In addition, the catalysts in polyester or polycarbonate may be previously inactivated partially or substantially perfectly by an arbitrary way. For example, when titanium tetrabutoxide is used as a catalyst, it is inactivated by addition of, for example, phosphorus compounds such as phosphorous acid, phosphoric acid, triphenyl phosphate, tris (triethylene glycol) phosphate, orthophosphoric acid, carbethyoxy dimethyl diethyl phosphonate, triphenyl phosphite, trimethyl phosphate, trimethyl phosphite and the like and others, but inactivation methods are not limited to this.

The above reaction may be carried out by arbitrarily determining combinations of a reaction temperature, a catalyst concentration and a reaction period. That is, the optimal reaction condition varies depending of various factors such as kinds and amount ratios of a hard segment and a soft segment to be used, shapes of a device to be used, a stirring conditions and the like.

The optimal reaction condition is a case, for example, where a difference obtained by comparing a melting point of the obtained polymer and a melting point of polyester used as a hard segment is 2° C.-60° C. When the melting point difference is less than 2° C., obtained polymers show poor elastic performances because both segments were neither mixed nor reacted. On the other hand, when the melting point difference is more than 60° C., obtained polymers show decreased block order resulting in decreases in crystallinity, elastic performances and the like because transesterification rapidly proceeded.

It is desirable that the remaining catalysts in the molten mixture obtained by the above reaction are inactivated as possible as perfectly by an arbitrary way. It can be assumed that when catalysts remain more than required, transesterification may further proceed at a time of compounding, molding and the like to alter physical properties of the obtained polymer.

The inactivation reaction may be carried out, for example, according to the above manner, that is, by addition of phosphorus compounds such as phosphorous acid, phosphoric acid, triphenyl phosphate, tris(triethylene glycol) phosphate, orthophosphoric acid, carbethyoxy dimethyl diethyl phosphonate, triphenyl phosphite, trimethyl phosphate, trimethyl phosphite and the like, and others, but inactivation methods are not limited to this.

The thermoplastic polyester elastomer of the present invention may contain a small amount of polycarboxylic acid or polyol having three or more of functional groups. For example, trimellitic anhydride, benzophenonetetracarboxylic acid, trimethylolpropane, glycerin and the like may be used.

In order to the polymerization degree of the thermoplastic polyester elastomer of the present invention, a solid phase polymerization may be carried out on after the reaction in a molten state. The solid phase polymerization may be carried out by purging particles of the obtained thermoplastic polyester elastomer under an inert gas atmosphere usually in nitrogen, carbon dioxide, argon and the like and, then, by heating them under an inert gas atmosphere and/or under reduced pressure at an absolute pressure of 13333-13.3 Pa and at a temperature lower than a sticky temperature of resin by −70° C. with rotating or flowing to prevent particles from adhering to each other to form solid phase polymerized resin.

A reaction temperature for a solid phase polymerization is preferably 140-210° C., more preferably 150-190° C. When the reaction temperature for a solid phase polymerization is below the above temperature range, the polymerizing rate tends to be insufficient. On the other hand, when the reaction temperature is above the above temperature range, problems tend to occur such as adhesion of particles each other, deterioration in color and the like.

A reaction period for a solid phase polymerization is preferably 3-200 hours, more preferably 5-150 hours. When the reaction period for a solid phase is below the above period range, a process control becomes difficult because a viscosity increasing rate is too much fast and the viscosity tends not to sufficiently increase. On the other hand, when the reaction period is above the above period range, problems tend to occur such as reduction in productivity, deterioration in color and the like.

In the thermoplastic polyester elastomer of the present invention, it is important that when melting points of the thermoplastic polyester elastomer are obtained by measuring on a differential scanning calorimeter in three cycles in which a temperature is raised from room temperature to 300° C. at a heating rate of 20° C./min., maintained at 300° C. for 3 minutes and lowered to room temperature at a cooling rate of 100° C./min., a melting point difference (Tm1−Tm3) between a melting point obtained in the first cycle (Tm1) and a melting point obtained in the third cycle (Tm3) is 0-50° C. The melting point difference is more preferably 0-40° C., further preferably 0-30° C. The melting point difference is a measure for block order-retaining ability of a thermoplastic polyester elastomer. The smaller difference shows more excellent block order-retaining ability. When the melting point difference is more than 50° C., the block order-retaining ability deteriorates to make quality fluctuation at a time of molding larger resulting in deterioration in uniformity of product quality and recycle properties.

By satisfying the above characteristics, the effect of excellent block order of the thermoplastic polyester elastomer of the present invention may be effectively used.

In the present invention, the hard segment comprises polybutylene terephthalate units and the melting points of the thermoplastic polyester elastomer are preferably 200-225° C., more preferably 205-225° C.

Further, in the present invention, the hard segment comprises polybutylene naphthalate units and the melting points of the thermoplastic polyester elastomer are preferably 215-240° C., more preferably 220-240° C.

When a hard segment comprising polybutylene terephthalate units or polybutylene naphthalate units is used, it is economically advantageous because commercial polyesters such as polybutylene terephthalate or polybutylene naphthalate may be used.

It is not preferable that the melting points of the thermoplastic polyester elastomer are below the above lower limits because its block order declines and heat resistance and mechanical properties of the thermoplastic polyester elastomer deteriorate. On the other hand, it is not preferable that the melting points are above the above upper limits because compatibility between the hard segment and the soft segment becomes worse and mechanical properties of the thermoplastic polyester elastomer deteriorate.

The thermoplastic polyester elastomer of the present invention comprises polyester units as a hard segment and aliphatic polycarbonate units as a soft segment. An average of a repeating number of repeating units constituting one of the homopolymer structure units is defined as an average chain length and in this text the value is calculated by using nuclear magnetic resonance (NMR) unless there is a specified instruction.

An average chain length of the hard segment is defined as (x) and an average chain length of the soft segment is defined as (y) when they are calculated by using nuclear magnetic resonance (NMR). It is preferable that the average chain length of the hard segment (x) is 5-20 and a block order (B) calculated with the following equation (1):

$$B=1/x+1/y \tag{1}$$

is 0.11-0.45.

In the thermoplastic polyester elastomer of the present invention, the average chain length of the polyester units which are a hard segment constituting component is preferably 5-20, more preferably 7-18, further preferably 9-16.

In the thermoplastic polyester elastomer of the present invention, an average chain length of polyester units in a hard segment (x) is an important factor which determines a block order of the thermoplastic polyester elastomer, greatly affects a melting point of the thermoplastic polyester elastomer. In general, as an average chain length of polyester units (x) increases, a melting point of the thermoplastic polyester elastomer rises. In addition, the average chain length of polyester units in a hard segment (x) is also a factor affecting mechanical properties of the thermoplastic polyester elastomer. When the average chain length of polyester units in a hard segment (x) is smaller than 5, it is suggested that randomization occurs and, therefore, heat resistance and mechanical properties such as hardness, tensile strength, elasticity and the like greatly deteriorate. When the average chain length of polyester units in a hard segment (x) is larger than 20, compatibility with aliphatic carbonate diol constituting the soft segment becomes worse to cause phase separation and, thereby, mechanical properties are greatly affected resulting in decreases in its strength and elongation.

A block order (B) is preferably 0.11-0.45, more preferably 0.13-0.40, further preferably 0.15-0.35. As this value becomes larger, the block order declines. It is not preferable that the block order is larger than 0.45 because polymer characteristics deteriorate due to decline of the block order, for example, a melting point of the thermoplastic polyester elastomer declines, and the like. On the other hand, it is not preferable that the block order is smaller than 0.11 because compatibility between the hard segment and the soft segment deteriorates, resulting in deterioration in mechanical properties such as strength and elongation and flex resistance and the like of the thermoplastic polyester elastomer, and increase in fluctuation of those mechanical properties.

Additionally, the block order is calculated by the following equation (1).

$$B = 1/x + 1/y \quad (1)$$

Based on the above relationship, an average chain length (y) of the soft segment is preferably 4-15.

Only by satisfying the block order, both excellent heat resistance and excellent mechanical properties can be simultaneously obtained.

In the present invention, a method for adjusting the block order-retaining ability and the block order within the above ranges is not limited but it is preferable to optimize a molecular weight of a raw material polycarbonate diol. That is, it is preferable to prepare the thermoplastic polyester elastomer of the present invention by reacting polyester constituting the hard segment and aliphatic polycarbonate diol having a molecular weight of 5000-80000 in a molten state. As a molecular weight of aliphatic polycarbonate diol becomes larger, block order-retaining ability and a block order become better. A number-average molecular weight of the polycarbonate diol is preferably 5000 or higher, more preferably 7000 or higher, further preferably 10000 or higher with representing. The upper limit of the molecular weight of the polycarbonate diol is preferably 80000 or lower, more preferably 70000 or lower, further preferably 60000 or lower from a viewpoint of compatibility between the hard segment and the soft segment. When the molecular weight of the polycarbonate diol is too large, compatibility becomes worse to cause phase separation and, thereby, mechanical properties are greatly affected resulting in decreases in its strength and elongation.

A tensile strength at break of the thermoplastic polyester elastomer of the present invention is 15-100 MPa, preferably 20-60 MPa.

In addition, a modulus of flexure of the thermoplastic polyester elastomer of the present invention is preferably 1000 MPa or lower, more preferably 800 MPa or lower, further preferably 600 MPa or lower. It is not preferable that the modulus in flexure is more than 1000 MPa because flexibility of the thermoplastic polyester elastomer is insufficient. The lower limit is preferably 50 MPa or higher, more preferably 80 MPa or higher, further preferably 100 MPa or higher. When it is lower than 50 MPa, the thermoplastic polyester elastomer is too flexible to secure strength of products.

In addition, it is preferable that the thermoplastic polyester elastomer of the present invention causes abilities to retain elongation at break of 50% or higher and 80% or higher for the thermoplastic polyester elastomer composition separately after heat-aging test and after water-aging test evaluated by a method described in a section [Measurement methods].

A method for optimizing a molecular weight of the polycarbonate diol is not limited. Those having optimized molecular weights may be purchased or prepared. Low molecular weight polycarbonate diol may be used by previously increasing their molecular weights with a chain extending agent such as diphenyl carbonate, diisocyanate and the like.

For example, a method for preparing high molecular weight aliphatic polycarbonate diol includes reacting the aliphatic diol and the following carbonates such as dimethyl carbonate, diethyl carbonate, dipropyl carbonate, diisopropyl carbonate, dibutyl carbonate, dimethyl carbonate, diphenyl carbonate and the like.

Another method for preparing high molecular weight aliphatic polycarbonate diol includes reacting low molecular weight aliphatic polycarbonate diol and dimethyl carbonate, diethyl carbonate, dipropyl carbonate, diisopropyl carbonate, dibutyl carbonate, dimethyl carbonate, diphenyl carbonate or the like.

It is necessary that the thermoplastic polyester elastomer of the present invention composition comprises 0.01-20 parts by weight of a compound having one or more of groups reactive to the thermoplastic polyester elastomer with respect to 100 parts by weight of the thermoplastic polyester elastomer.

The reactive groups in the compound having one or more of groups reactive to the thermoplastic polyester elastomer are groups capable of reacting with hydroxyl groups or carboxyl groups contained in the thermoplastic polyester elastomer such as an epoxy group, an isocyanate group, an oxazoline group, a carbodiimide group, an acid anhydride group, a hydroxymethyl group, an amino group, a cyclicimino group and the like.

When the compound having one or more of groups reactive to the thermoplastic polyester elastomer in the present invention is an epoxy compound, its structure is not specially limited but it is a compound intramolecularly having one or more of epoxy groups, preferably two or three of epoxy groups.

Specifically, as epoxy compounds, diglycidyl ethers of bisphenol A, bisphenol F and bisphenol S and their oligomers, diglycidyl ethers of hydrogenated bisphenol A, hydrogenated bisphenol F and hydrogenated bisphenol S and their oligomers, diglycidy orthophthalate, diglycidyl isophthalate, diglycidyl terephthalate, diglycidyl p-oxybenzoate, diglycidyl tetrahydrophthalate, diglycidyl hexahydrophthalate, diglycidyl succinate, diglycidyl adipinate, diglycidyl sebacate, ethylene glycol diglycidyl ether, propylene glycol diglycidyl ether, 1,4-butanediol glycidyl ether, 1,6-hexanediol diglycidyl ether and polyalkylene glycol diglycidyl ethers, triglycidyl trimellitate, triglycidyl isocyanurate, 1,4-diglycidyloxybenzene, diglycidylpropyleneurea, glycerol triglycidyl ether, trimethylolethane triglycidyl ether, trimethylolpropane triglycidyl ether, pentaerythritol tetraglycidyl ether, polyglycidyl ethers of glycerol alkylene oxide adducts, glycidyl ether-type epoxy such as cresol novolac-type glycidyl ether, phenolnovolac-type glycidyl ether and the like, alicyclic epoxy such as 3,4-epoxycyclohexylmethacrylate, cyclopentadiene diepoxide and the like, oligomer-type alicyclic epoxy, triglycidyl isocyanurate, and others. These may be optionally used by mixing them. Among them, those being crystalline and capable of being powderized are preferred from viewpoints of homogenization in reaction and prevention of gelling. Preferable examples include triglycidyl isocyanurate, preferably powdery one having an average particle size of 100 μm or smaller.

The amount of these epoxy compounds having one or more of groups reactive to the thermoplastic polyester elastomer to be used varies depending on an amount of functional groups existing at ends of the used thermoplastic polyester elastomer or demanded characteristics for composition finally obtained. The amount is preferably 0.01-5 parts by weight, more preferably 0.05-4 parts by weight, further preferably 0.1-3 parts by weight of with respect to 100 parts by weight of the thermoplastic polyester elastomer. When the amount is less than 0.01 parts by weight, effects caused by reaction of those compounds, for example, an improving effect on formability due to thickening, improving effects on heat resistance and hydrolysis resistance, can not exert. On the other hand, when the amount is more than 5 parts by weight, product quality is adversely affected by existing of unreacted compounds for example, surface conditions of a molded product become coarse, gelation occurs, and others.

In the thermoplastic polyester elastomer of the present invention composition, a reaction between the thermoplastic polyester and the epoxy compound having one or more of groups reactive to the thermoplastic polyester elastomer may be taken place without using a catalyst but it is desirable to use a catalyst from a viewpoint of reaction enhancement or improvement of affinity. Catalysts may include generally amines, imidazols, phosphorus compounds, metal salts of monocarboxylic acid and/or dicarboxylic acids having a carbon number of 10 or more with Ia or IIa group metals selected from the Element Periodic Table, and others. Among them, trivalent phosphorus compounds such as tributylphosphine, triphenylphosphine and the like; metal salts of stearic acid such as calcium stearate, sodium stearate and the like; imidazols such as 2-ethyl-4-methylimidazol, 2-phenylimidazol, 2-phenylimidazoline and the like; and others are preferable. These catalysts may be used alone or in mixture of two or more of them. Further, the above catalysts exert the same effect regardless of a lump addition or a divisional addition. The amount of a catalyst to be added is usually 2 parts by weight of or smaller, preferably 0.03-1 parts by weight of with respect to 100 parts by weight of the thermoplastic polyester elastomer.

When the compound having one or more of groups reactive to the thermoplastic polyester elastomer in the present invention is an isocyanate compound, although isocyanate compounds having any structure may be used as far as they intramolecularly have one or more of isocyanate groups, a compound intramolecularly having two or more of isocyanate groups should be necessarily used. These compounds include isocyanates usually used in urethane synthesis. Specifically, diphenylmethane diisocyanate (MDI), trilene diisocyanate, polymeric MDI, dianisidine diisocyanate, diphenyl ether diisocyanate, orthtridine diisocyanate, naphthalene diisocyanate, triphenylmethane triisocyanate, triisocyanate phenylthiophosphate, hexamethylene diisocyanate, isophorone diisocyanate, lysine diisocyanate methyl ester, methxylylene diisocyanate, 2,2,4-trimethylhexamethylene diisocyanate, diisocyanate dimerate, isopropylidene bis(4-cyclohexylisocyanate), dicyclohexylmethane diisocyanate, methylcyclohexane diisocyanate, a trilene diisocyanate dimer and the like. Two or more of isocyanates may be used together.

The amount of isocyanate compounds to be used in the present invention is preferably 0.5-2 times in mole, more preferably 0.5-1.0 times in mole with respect to the sum of the total moles of end hydroxyl groups and the total moles of end carboxyl group in the hard segment and soft segment of the thermoplastic polyester elastomer.

In preparing the thermoplastic polyester elastomer composition, an isocyanate compound may be subjected to a reaction by adding in a molten state. A temperature for molten mixing the isocyanate compound (a reaction temperature) may be temperatures at which hard components, soft components, formed resin actually melt. This reaction is usually carried out at 170-280° C. When the reaction temperature is high, it is required to take care of thermal decomposition of the hard component, the soft component, the formed resin, and when the reaction temperature is low, it is required to take care of crystallization and reduction in a reaction rate. A kneading period is around 1-100 minutes and determined depending on a manner and temperature for mixing, reaction conditions for carboxylic acids which will be mentioned below. Preferably, it is set to 2-60 minutes.

The reaction of isocyanate compounds may be carried out in the presence of a catalyst. All catalysts usually used in reactions for isocyanates may be used and amines, various organic metal compounds are included.

As amines, triethylamine, monoamines such as N,N-dimethylcyclohexylamine and the like; diamines such as N,N,N',N'-tetramethylethylenediamine and the like; triamines such as N,N,N',N'',N''-pentamethyldiethylenetriamine and the like; triethylene diamine; cyclic amines intramolecularly having a piperazine or imidazol skeleton; other alcohol amines; ether amines; and the others may be used. As organic metal compounds, mainly organic tin-type compounds and their salts, halides of carboxylic acid are used. Specifically, stannous octoate, dibutyltin diacetate, dibutyltin dilaurate, dibutyltin dimercaptide, dibutyltin thiocarboxylate, dibutyltin dimaleate, dioctyltin dimercaptide and the like may be used. Two or more of catalysts may be used together.

These catalysts may be added together with isocyanate compounds, or after previously dispersing isocyanate compounds into the hard component, the soft component in a molten state, or to the contrast, these catalysts may be dispersed.

Polycarbodiimides use in the present invention as the compound having one or more of groups reactive to the thermoplastic polyester elastomer are polycarbodiimides intramolecularly having two or more of structures —N=C=N—, and polycarbodiimide, alicyclic polycarbodiimide, aromatic polycarbodiimide and copolyemers of these structures may be used.

The polycarbodiimides used in the present invention are, for example, prepared with decarboxylation of diisocyanate compounds. As diisocyanates, 4,4-diphenylmethanediisocyanate, 4,4-diphenyldimethylmethanediisocyanate, 1,3-phenylenediisocyanate, 1,4-phenylenediisocyanate, 2,4-trilene diisocyanate, 2,6-trilene diisocyanate, 1,5-naphthylene diisocyanate, hexamethylene diisocyanate, dicyclohexylmethane diisocyanate, cyclohexane1,4-diisocyanate, xylylene diisocyanate, isophoronediisocyanate, methylcyclohexanediisocyanate, tetramethylxylylene diisocyanate, 1,3,5-triisopropylphenylene-2,4-diisocyanate and the like may be used alone or as copolymers of two or more of them. In addition, a branched structure may be introduced and a functional group other than a carbodiimide group and an isocyanate group may be introduced by copolymerizing. Further, the end isocyanates may be used as they are, but a polymerization number may be controlled by reacting the end isocyanates, or a part of the end isocyanates may be hindered. As end group-hindering agents, monoisocyanate compounds such as phenyl isocyanate, tris isocyanate, dimethyl phenyl isocyanate, cyclohexyl isocyanate, butyl isocyanate, naphthyl isocyanate and the like; compounds having a —OH group, a —COOH group, a —SH group, a —NH—R group (wherein, R is a hydrogen atom or an alkylgroup) and the like may be used.

Among these polycarbodiimides, alicyclic polycarbodiimides are preferable, in which dicyclohexylmethane diisocyanate, cyclohexane 1,4-diisocyanate, isophorone diisocyanate and the like are used as a main raw material. In addition, those having an isocyanate group at end and their isocyanate group contents are preferably about 0.5-4 weight %, more preferably about 1-3 weight %, from a viewpoint of safety and handling.

Especially, polycarbodiimides derived from dicyclohexylmethane diisocyanate or isophorone diisocyanate and having an isocyanate group of 0.5-4 weight % are preferable, and those having an isocyanate group of 1-3 weight % are more preferable. The isocyanate group content may be measured by using a conventional manner (a method comprising solution with amines and back titration with hydrochloric acid).

Further, in the present invention, a number of carbodiimide groups in a polycarbodiimide molecular is preferably 2-50, more preferably 5-30, from a viewpoint of safety and handling.

It is preferable that a polycarbodiimide has a polymerization number in the above range and is in solid around room temperature, since it can be powderized so that workability in mixing with the thermoplastic polyester elastomer and compatibility with the thermoplastic polyester elastomer are excellent as well as from viewpoints of uniformity in reaction and bleeding-out resistance.

The amount of polycarbodiimide to be added is preferably 0.05-5 parts by weight, more preferably 0.1-4 parts by weight, further preferably 0.5-4 parts by weight of with respect to 100 parts by weight of the thermoplastic polyester elastomer. When the amount is more than 5 parts by weigh, softness may be spoiled, or mechanical characteristics, heat resistance, melt viscosity may deteriorate. On the other hand, when the amount is less than 0.05 parts by weight, since an amount of —N=C=N— in the composition becomes smaller, effects on improvements in water-aging resistance and extrusion properties may deteriorate.

A reaction between the thermoplastic polyester elastomer and polycarbodiimide may be taken place without using a catalyst but it is desirable to use a catalyst from a viewpoint of reaction enhancement. As catalysts, amines, imidazols, and the like are generally preferable.

In addition, various additives may be added to the thermoplastic polyester elastomer of the present invention depending on purposes to obtain compositions. As additives, known hindered phenol-type, sulfur-type, phosphorus-type, amine-type antioxidant, hindered amine-type, triazol-type, benzophenone-type, benzoate-type, nickel-type, salicyl-type and other types light stabilizers; antistatic agents; slipping agents; molecular weight modifiers such as peroxide and the like; compounds having a reactive group such as an epoxy-type compound, an isocyanate-type compound, a carbodiimide-type compound and the like; metal inactivation agents; organic or inorganic cores; neutralizer; acid retarder; antibacterial agents; fluorescent whitener; fillers; flame retardant; flame retardant assistants; organic or inorganic pigments; and others may be added.

Hindered phenol-type antioxidants which may be used in the present invention include 3,5-di-t-butyl-4-hydroxy-toluene, n-octadecyl-β-(4'-hydroxy-3',5'-di-t-butylphenyl)propionate, tetrakis[methylene-3-(3',5'-di-t-butyl-4'-hydroxyphenyl)propionate]methane, 1,3,5-trimethyl-2,4,6'-tris(3,5-di-t-butyl-4-hydroxybenzyl)benzene, calcium (3,5-di-t-butyl-4-hydroxy-benzyl-monoethyl-phosphate), triethylene glycol-bis[3-(3-t-butyl-5-methyl-4-hydroxyphenyl)propionate], pentaerythrityl-tetrakis[3-(3,5-di-t-butylanilino)-1,3,5-triazine, 3,9-bis[1,1-dimethyl2-{β-(3-t-butyl-4-hydroxy-5-methylphenyl)propionyloxy}ethyl]2,4,8,10-tetraoxaspiro[5,5] undecane, bis[3,3-bis(4'-hydroxy-3'-t-butylphenyl)butylic acid]glycol ester, triphenol, 2,2'-ethylidene bis(4,6-di-t-butylphenol), N,N'-bis[3-(3,5-di-t-butyl-4-hydroxyphenyl)propionyl]hydrazine, 2,2'-oxamide bis[ethyl-3-(3,5-di-t-butyl-4-hydroxyphenyl)propionate], 1,1,3-tris(3',5'-di-t-butyl-4'-hydroxybenzyl)-S-triazin-2,4,6 (1H,3H,5H)-trione, 1,3,5-tris(4-t-butyl-3-hydroxy-2,6-dimethylbenzyl)isocyanurate, 3,5-di-t-butyl-4-hydroxyhydrocinnamic acid triester with 1,3,5-tris(2-hydroxyethyl)-S-triazin-2,4,6 (1H,3H,5H), N,N-hexamethylene bis(3,5-di-t-butyl-4-hydroxy-hydrocinnamide), 3,9-bis[2-{3-(3-t-butyl-4-hydroxy-5-methylphenyl) propionyloxy}-1,1-dimethylethyl]-2,4,8,10-tetraoxaspiro [5.5]undecane and the like.

Sulfur-type antioxidants which may be used in the present invention include dilauryl-3,3'-thiodipropionate, dimyristyl-3,3'-thiodipropionate, distearyl-3,3'-thiodipropionate, lauryl stearyl-3,3'-thiodipropionate, dilauryl thiodipropionate, dioctadecyl sulfide, pentaerythritol-tetra (β-lauryl-thiopropionate) ester and the like.

Phosphorus-type antioxidants which may be used in the present invention include tris(mixed, mono- and di-Norylphenyl)phosphite, tris(2,3-di-t-butylphenyl)phosphite, 4,4'-butylidene bis(3-methyl-6-t-butylphenyl-di-tridecyl) phosphite, 1,1,3-tris(2-methyl-4-di-tridecylphosphite-5-t-butylphenyl)butane, tris(2,4-di-t-butylphenyl)phosphite, bis (2,4-di-t-butylphenyl)pentaerythritol diphosphite, tetrakis(2, 4-di-t-butylphenyl)-4,4'-biphenilene phosphite, bis(2,6-di-t-butyl-4-methylphenyl)pentaerythritol-diphosphite, tetrakis (2,4-di-t-butylphenyl) 4,4'-biphenylene diphosphonite, triphenyl phosphite, diphenyl decyl phosphite, tridecyl phosphite, trioctyl phosphite, tridocecyl phosphite, trioctadecyl phosphite, trinonylphenyl phosphite, tridocecyl trithiophosphite and the like.

Amine-type antioxidants which may be used in the present invention include amines such as N,N-diphenylethylenediamine, N,N-diphenyl acetoamidine, N,N-diphenylformamidine, N-phenylpiperidine, dibenzylethylenediamine, triethanolamine, phenothiazine, N,N'-di-sec-butyl-p-phenylenediamine, 4,4'-tetramethyl-diaminodiphenylmethane, p,p'-dioctyl-diphenylamine, N,N'-bis(1,4-dimethylpentyl)-p-phenylenediamine, phenyl-α-naphthylamine, phenyl-β-naphthylamine, 4,4'-bis(4-α,α-dimethylbenzyl)diphenylamine and the like; their derivatives; reaction products of amine and aldehyde; reaction products of amine and ketone.

Hindered amine-type light stabilizers which may be used in the present invention include condensation polymers of dimethyl succinate with 1-(2-hydroxyethyl)-4-hydroxy-2,2, 6,6-tetramethylpiperidine, poly[[6-(1,1,3,3-tetrabutyl) imino-1,3,5-triazin-2,4-diyl]hexamethylene[(2,2,6,6-tetramethyl-4-piperidyl)imyl]], bis(1,2,2,6,6-pentamethyl-4-piperidyl) 2-n-butylmalonate, tetrakis(2,2,6,6-tetramethyl-4-piperidyl) 1,2,3,4-butanetetracarboxylate, bis(2,2,6,6-tetramethyl-4-piperidyl) sebacate, condensation polymers of N,N'-bis(2,2,6,6-tetramethyl-4-piperidyl)hexamethylenediamine and 1,2-dibromoethane, poly[(N,N'-bis(2,2,6,6-tetramethyl-4-piperidyl)hexamethylenediamine)-(4-morpholino-1,3,5-triazin-2,6-diyl)-bis (3,3,5,5-tetramethylpiperadinon)], tris(2,2,6,6-tetramethyl-4-piperidyl)-docecyl-1,2,3,4-butanetetracarboxylate, tris(1,2, 2,6,6-pentamethyl-4-piperidyl)-docecyl-1,2,3,4-butanetetracarboxylate, bis(1,2,2,6,6-pentamethyl-4-piperidyl) sebacate, 1,6,11-tris[{4,6-bis(N-butyl-N-(1,2,2,6, 6-pentamethylpiperidine-4-yl)amino-1,3,5-triazin-2-yl) amino}undecane, 1-[2-(3,5-di-t-butyl-4-hydroxyphenyl) propionyloxy]-2,2,6,6-tetramethylpiperidine, 8-benzyl-7,7, 9,9-tetramethyl-3-octyl-1,3,8-triazaspiro[4,5]undecane-2,4-dione, 4-benzoyloxy-2,2,6,6-tetramethylpiperidine, N,N'-bis (3-aminopropyl)ethylenediamine-2,4-bis[N-butyl-N-(1,2,2, 6,6-pentamethyl-4-piperidyl)amino]-6-chloro-1,3,5-triazine condensation and the like.

Benzophenone-type, benzotriazol-type, triazol-type, nickel-type and salicyl-type light stabilizers which may be used in the present invention include light stabilizers such as 2,2'-di-hydroxy-4-methoxybenzophenone, 2-hydroxy-4-n-octyloxybenzophenone, p-t-butylphenyl salicylate, 2,4-di-t-butylphenyl-3,5-di-t-butyl-4-hydroxybenzoate, 2-(2'-hydroxy-5'-methylphenyl)benzotriazole, 2-(2'-hydroxy-3',5'-di-t-amyl-phenyl)benzotriazole, 2-[2'-hydroxy-3',5'-bis(α, α-dimethylbenzylphenyl)benzotriazole, 2-(2'-hydroxy-3'-t- butyl-5'-methylphenyl)-5-chlorobenzoazotriazole, 2-(2'-hydroxy-3',5'-di-t-butylphenyl)-5-chlorobenzothiazole, 2,5-bis[5'-t-butylbenzooxazolyl-(2)]-thiophene, nickel bis (monoethyl 3,5-di-t-butyl-4-hydroxybenzylphosphate), a mixture of bisanilide 2-ethoxy-5-t-butyl-2'-ethyloxalate 85-90% and bisanilide 2-ethoxy-5-t-butyl-2'-ethyl-4'-t-butyloxalate 10-15%, 2-[2-hydroxy-3,5-bis(α,α-dimethylbenzyl)phenyl]-2H-benzotriazole, bisanilide 2-ethoxy-2'-ethyloxalate, 2-[2'-hydroxy-5'-methyl-3'-(3",4",5",6'-tetrahydrophthalimide-methyl)phenyl]benzotriazole, bis(5-benzoyl-4-hydroxy-2-methoxyphenyl)methane, 2-(2'-hydroxy-5'-t-octylphenyl)benzotriazole, 2-hydroxy-4-i-octyloxybenzophenone, 2-hydroxy-4-docecyloxybenzophenone, 2-hydroxy-4-octadecyloxybenzophenone, phenyl salicylate and the like.

Slipping agents which may be used in the present invention include hydrocarbon-type, fatty acid-type, fatty acidamide-type, ester-type, alcohol-type, metal soap-type, natural wax-type, silicone-type, fluorine-type compounds and the like. Specifically, included are slipping agents such as liquid paraffin, synthetic paraffin, synthetic hard paraffin, synthetic isoparaffin petroleum hydrocarbon, chlorinated paraffin, paraffin wax, microcrystalline wax, low-polymerization-degree polyethylene, fluorocarbon oil, fatty acid compounds having a carbon number of 12 or more such as lauric acid, myristic acid, palmitic acid, stearic acid, arachidic acid, behenic acid and the like, hexylamide, octylamide, stearylamide, palmitylamide, oleylamide, erucylamide, ethylene bisstearylamide, laurylamide, behenylamide, methylene bisstearylamide, ricinol amide such as saturated or unsaturated aliphatic amide having a carbon number of 3-30 and their derivatives, a lower alcohol ester of fatty acid, a polyhydric alcohol ester of fatty acid, a polyglycol ester of fatty acid, a fatty alcohol ester of fatty acid such as butyl stearate, hydrogenated castor oil, ethylene glycol monostearate and the like, cetyl alcohol, stearyl alcohol, ethylene glycol, polyethylene glycols having a molecular weight of 200 from 10000 or higher, polyglycerol, carnauba wax, candelilla wax, montan wax, dimethylsilicone, silicone gum, ethylene tetrafluoride and the like. In addition, metal salts of a compound containing linear saturated fatty acid, an acid at a side chain, ricinoleic acid, wherein the metal is selected from Li, Mg, Ca, Sr, Ba, Zn, Cd, Al, Sn and Pb may be also included.

Fillers which may be used in the present invention include oxides such as magnesium oxide, aluminium oxide, silicon oxide, calcium oxide, titanium oxide (a rutile form, an anatase form), chromium oxide (trivalent), iron oxide, zinc oxide, silica, diatomaceous earth, alumina fiber, antimony oxide, barium ferrite, strontium ferrite, beryllium oxide, pumice, pumice balloon and the like, basic substances or hydroxides such as magnesium hydroxide, aluminium hydroxide, magnesium carbonate basic and the like, salts of carbonic acid such as magnesium carbonate, calcium carbonate, barium carbonate, ammonium carbonate, calcium sulfite, dolomite, dowsonite and the like, salts of sulfurous acid or sulfuric acid such as calcium sulfate, barium sulfate, ammonium sulfate, calcium sulfite, magnesium sulfate basic and the like, salts of silicic acid such as sodium silicate, magnesium silicate, aluminium silicate, potassium silicate, calcium silicate, talc, clay, mica, asbestos, glass fibers, montmorillonite, glass balloons, glass beads, pentonite and the like, kaoline (clay for earthen wares), pearlite, iron powder, copper powder, lead powder, aluminium powder, tungsten powder, molybdenum sulfide, carbon black, boron fibers, silicon carbide fibers, brass fibers, potassium titanate, lead titanate zirconate, zinc borate, aluminium borate, barium metaborate, calcium borate, sodium borate, and others.

Flame retardant assistants which may be used in the present invention include antimony trioxide, antimony tetraoxide, antimony pentaoxide, sodium pyrroantimonate, tin dioxide, zinc metaborate, aluminium hydroxide, magnesium hydroxide, zirconium oxide, molybdenum oxide, red phosphorus compounds, ammonium polyphosphate, melamine cyanurate, ethylene tetrafluoride and the like.

Compounds having a triazine group and/or their derivatives which may be used in the present invention include melamine, melamine cyanurate, melamine phosphate, guanidine sulfamate and the like.

In phosphorus compounds which may be used in the present invention, inorganic phosphorus compounds include red phosphorus compounds, ammonium polyphosphate and the like. Red phosphorus compounds include resin-coated red phosphorus, complex compounds with aluminium, and the like. Organic phosphorus compounds include phosphoric acid ester, melamine phosphate and the like. Phosphoric acid esters include phosphates, phosphonates and phosphinates such as trimethyl phosphate, triethyl phosphate, tributyl phosphate, trioctyl phosphate, trioctyl phosphite, tributoxyethyl phosphate, octyldiphenyl phosphate, tricresyl phosphate, cresyl diphenyl phosphate, triphenyl phosphate, trixylenyl phosphate, tris-isopropylphenyl phosphate, diethyl N,N-bis(2-hydroxyethyl)aminomethyl phosphonate, bis(1,3-phenylenediphenyl)phosphate; aromatic condensed phosphoric acid ester such as 1,3-[bis(2,6-dimethylphenoxy) phosphenyloxy]benzene, 1,4-[bis(2,6-dimethylphenoxy) phosphenyloxy]benzene; and others are preferable from viewpoints of hydrolysis resistance, thermal stability and flame resistance.

These additives may be compounded by using kneading machines such as heating rolls, extruders, Banbury mixers and the like. These additives may be added to or mixed with oligomers before transesterification when preparing a thermoplastic polyester elastomer resin composition or before condensation polymerization.

The thermoplastic polyester elastomer of the present invention composition is molded from a melt by ordinary molding techniques such as injection molding, flat film extrusion, extrusion blow molding or co-extrusion.

A method for producing the thermoplastic polyester elastomer will be explained blow in detail.

In the method for producing the thermoplastic polyester elastomer of the present invention, it is important to use aliphatic polycarbonate diol whose molecular weight has been previously increased with a chain extending agent. That is, it is preferable to carry out block polymerization by previously increasing a molecular weight of aliphatic polycarbonate diol to be used as a raw material with a chain extending agent before supplying into block polymerization to adjust the molecular weight of aliphatic polycarbonate diol within an optimum range and then supplying it into block polymerization.

As the molecular weight of the raw material polycarbonate diol becomes higher, block order and block order-retaining ability improve. However, it is not preferable that the molecular weight is too high because compatibility between the hard segment and the soft segment deteriorates. Accordingly, the molecular weight of the polycarbonate diol is preferably 5000-80000, more preferably 7000-70000, further preferably 8000-60000 in a number-average molecular weight. It is not preferable that the molecular weight of the polycarbonate diol is lower than 5000 because block order and block order-retaining ability becomes worse. On the other hand, it is not preferable that the molecular weight of the polycarbonate diol is higher than 80000 because compatibility between the hard segment and the soft segment deteriorates, mechanical properties such as strength and elongation of obtained thermoplastic polyester elastomers becomes worse and fluctuation of those characteristics may increase.

For example, molecular weights of commercial aliphatic polycarbonate diol are 3000 or lower. Therefore, a preferred embodiment is to use these commercial aliphatic polycarbonate diol having a low molecular weight to obtain aliphatic polycarbonate diol in the preferred range.

The chain extending agent is not limited as far as it is a multifunctional active compound intramolecularly comprising two or more of functional groups reactive to end hydroxyl groups in aliphatic polycarbonate diol. A number of functional groups is not limited as far as two or more, difunctional ones are preferable. For example, diphenyl carbonate, diisocyanate, dicarboxylic anhydride and the like are included. Tri- or higher functional compounds may be used at a small amount. In place of diphenyl carbonate, carbonate compounds such as dimethyl carbonate, diethyl carbonate, dipropyl carbonate, diisopropyl carbonate, dibutyl carbonate, dimethyl carbonate and the like may be used. In addition, cyclic carbonate and dithiocarbonate compounds such as ethylene carbonate and the like may be used. Further, in replace of phenoxy groups in diphenyl carbonate, carbonyl compounds of nitrogen-containing compound residues such as imidazole, lactam and the like may be used.

In the above method, the low molecular weight aliphatic polycarbonate diol before its molecular weight is increased is preferably a commercial product but it is not limited. For example, when a special copolymer is required as aliphatic polycarbonate diol, specially prepared ones may be used.

In the above method, adjustment of the molecular weight of the obtained aliphatic polycarbonate diol may be carried out by varying a molecular weight of the raw material aliphatic polycarbonate diol and a mixing ratio between the aliphatic polycarbonate diol and the chain extending agent. In addition, adjustment can be carried out with a reaction period. The molecular weight of the obtained aliphatic polycarbonate diol becomes higher as a molecular weight of a starting raw material becomes higher and a mixing ratio of the chain extending agent becomes smaller. Conditions may be determined depending on the target molecular weight.

In the reaction method carried out as above, reaction conditions such as a reaction temperature, a reaction period, stirring conditions and the like are not limited as far as low molecular weight aliphatic polycarbonate diol having a molecular weight lower than the final molecular weight and a chain extending agent are mixed in a reactor. For example, when diphenyl carbonate is used as a chain extending agent, it is preferable to carry out the following method.

For example, it may be obtained by mixing commercial polycarbonate diol comprising 1,6-hexanediol (molecular weight 2000) and diphenyl carbonate under normal pressure to under pressure, by heating and progressing a reaction in a molten state with removing phenol produced in the reaction. A method for removing phenol is not limited. For example, a method for reducing pressure with a vacuum pump, an ejector or others, or a method for flowing an inactive gas, and the like.

In the above reaction, the mixing ratio of diphenyl carbonate to polycarbonate diol [diphenyl carbonate/polycarbonate diol comprising 1,6-hexanediol (molecular weight 2000)] is preferably in a range of 0.5-1.5, more preferably in a range of 0.6-1.4. Out of the range, it is difficult to obtain desired molecular weights. In addition, it is preferable to drive out oxygen by purging a reactor with an inactive gas during mixing raw materials and reacting. It is not preferable that an amount of residual oxygen is too large because reaction products may develop color. A temperature within a reactor during mixing the raw materials is preferably 100-130° C. A temperature is raised to 150-250° C. with stirring after mixing raw materials to progress a reaction. A reaction temperature is more preferably 170-240° C., further preferably 180-230° C. When the reaction temperature is lower than 150° C., since the reaction rate is very small, a molecular weight can not reach a desired molecular weight or a reaction period becomes very long resulting in high production cost. On the other hand, it is not preferable that the reaction temperature is higher than 250° C. because a decomposition reaction is enhanced due to heat deterioration and a reaction product develops color. It is preferable that when a temperature reaches the predetermined reaction temperature, a pressure in a reactor is gradually reduced from normal pressure to a pressure of 530 Pa or lower over 30-120 minutes and phenols liberating in the reaction are removed. The pressure is more preferably 400 Pa or lower, further preferably 270 Pa or lower. When the pressure is higher than 530 Pa, since the removal speed of phenol liberating during reaction progress becomes very slow, a molecular weight can not reach a desired molecular weight or a reaction period becomes very long resulting in high production cost. It is preferable that a time period for reaction after reaching a predetermined degree of vacuum is as short as possible. The time period is preferably 240 minutes or shorter, more preferably 180 minutes or shorter, further preferably 120 minutes or shorter. Stirring is stopped when the molecular weight reaches the target molecular weight and the pressure is recovered to normal pressure with a nitrogen gas. Polycarbonate diol whose molecular weight has been increased in a sheet state is obtained. It is preferable to control the molecular weight of polycarbonate diol based on the stirring power in the react as a measure.

In the present invention, it is preferable to prepare it by reacting aromatic dicarboxylic acid, polyester constituted with aliphatic or alicyclic diol and aliphatic polycarbonate diol whose molecular weight has been increased in a molten state. Production conditions are not limited as far as they satisfy the above requirements but it is preferable to carry out, for example, the following methods.

For example, polybutylene terephthalate is used as polyester constituted with aromatic dicarboxylic acid and aliphatic or alicyclic diol, predetermined amounts of the polybutylene terephthalate and polycarbonate diol comprising 1,6-hexanediol whose molecular weight has been increased are simultaneously placed into a reactor, oxygen in the reactor is driven out with an inactive gas and then a pressure in the reactor is reduced. The pressure in the reactor is preferably 400 Pa or lower, more preferably 270 Pa or lower, further preferably 140 Pa or lower. The mixture is stirred with maintaining the reduced pressure and the temperature is gradually raised to dissolve the reaction materials to progress a reaction at a temperature higher than the melting point of polybutylene terephthalate by 5-40° C. The temperature difference is more preferably 7-35° C., further preferably 10-30° C. When the temperature difference is smaller than 5° C., since polybutylene terephthalate solidifies and is impossible to be mixed uniformly, it is possible that quality in the obtained thermoplastic polyester elastomer deviates. On the other hand, when the temperature difference is larger than 40° C., since the reaction progress is too fast, random copolymerization occurs to form thermoplastic polyester elastomer having poor heat resistance. The reaction period is preferably 360 minutes or shorter, more preferably 300 minutes or shorter, further preferably 240 minutes or shorter. When the reaction period becomes too long, production cycle may extend and production cost may increase. When respective raw materials become uniform, the reaction is finished and stirring is stopped. The melted thermoplastic polyester elastomer is recovered from an outlet at a lower part of the reactor and it is solidified by cooling and, then, chips of thermoplastic polyester elastomer are obtained by using a chip cutter such as a strand cutter and the like.

In the present invention, it is important that the thermoplastic polyester elastomer is prepared by reacting polyester constituted with aromatic dicarboxylic acid and aliphatic or alicyclic diol (hereinafter, also referred to as simply "polyester") and aliphatic polycarbonate diol having a molecular weight compatible to the hydroxyl end group concentration in the thermoplastic polyester elastomer in a molten state. That is, it is preferable that the manufacturing is carried out by reacting polyester having a hydroxyl end group concentration of 0-55 eq/ton and aliphatic polycarbonate diol having a molecular weight within the following molecular weight range in a molten state.

In the above method for producing, it is preferable that the preferred molecular weight of aliphatic polycarbonate is within the following range. That is, it is preferable that when the lower limit of the molecular weight of the aliphatic polycarbonate diol is set to be equal to or higher than molecular weights on a line connecting a point of 3000 at a hydroxyl end group concentration of 0 eq/ton for polyester constituted with aromatic dicarboxylic acid and aliphatic or alicyclic diol and a point of 5000 at a hydroxyl end group concentration of 55 eq/ton for polyester constituted with aromatic dicarboxylic acid and aliphatic or alicyclic diol; and the upper limit of the molecular weight of the aliphatic polycarbonate diol is set to be equal to or lower than molecular weights on a line connecting a point of 30000 at a hydroxyl end group concentration of 0 eq/ton for polyester constituted with aromatic dicarboxylic acid and aliphatic or alicyclic diol and a point of 70000 at a hydroxyl end group concentration of 55 eq/ton for polyester constituted with aromatic dicarboxylic acid and aliphatic or alicyclic diol, the molecular weight of the aliphatic polycarbonate is on or between the two lines. It is more preferable that the lower limit is equal to or higher than molecular weights on a line connecting a point of 4000 at a hydroxyl end group concentration of 0 eq/ton for polyester and a point of 6000 at a hydroxyl end group concentration of 55 eq/ton for hard segment polyester. On the other hand, it is more preferable that the upper limit is equal to or lower than molecular weights on a line connecting a point of 28000 at a hydroxyl end group concentration of 0 eq/ton for polyester and a point of 65000 at a hydroxyl end group concentration of 55 eq/ton for hard segment polyester.

It is not preferable that the molecular weight is above the upper limit range because compatibility between the hard segment and the soft segment deteriorates, mechanical properties such as strength and elongation of obtained thermoplastic polyester elastomers becomes worse and fluctuation of those characteristics may increase. On the other hand, it is not preferable that the molecular weight is below the lower limit range because block order and block order-retaining ability become worse.

The correlation between the hydroxyl end group concentration of polyester and the preferred molecular weight of aliphatic polycarbonate diol is shown in FIG. 1.

Components in and a method for producing the polyester are not limited as far as it has the above mentioned components and molecular weight and its hydroxyl end group concentration is 0-55 eq/ton. In addition, a method for adjusting the hydroxyl end group concentration is not limited, neither. For example, it is preferable that the method is carried out by optimizing the production condition for the polyester. In addition, a method is carried out on polyesters conventionally obtained by a lysis method such as hydrolysis, pyrolysis and the like; an end group modification with acid anhydride, cyclic ether and the like; and others are included. Further, glycol-lysis or dicarboxylic acid-lysis may be used.

In the present invention, a method for adjusting the molecular weight of aliphatic polycarbonate diol is not limited. For example, since molecular weights of commercial aliphatic polycarbonate diol are below the preferred molecular weight range in the present invention, it is preferable that the molecular weight of the commercial low molecular weight aliphatic polycarbonate diol is previously increased with a chain extending agent to adjust the molecular weight. That is, it is preferable that block polymerization is carried out by supplying aliphatic polycarbonate diol after previously increasing the molecular weight of aliphatic polycarbonate diol with a chain extending agent to adjust the molecular weight in the above optimized range.

The above method using a commercial low molecular weight product shows a great economic effect because aliphatic polycarbonate diol having an arbitrary molecular weight may be easily produced and because this method may be carried out in-plant by using a device for manufacturing the thermoplastic polyester elastomer of the present invention. In addition, the above method has an advantage that arbitrarily desired molecular weights can be achieved in a simple manner by using a commercial low molecular weight aliphatic polycarbonate diol and by changing a mixing ratio of a chain extending agent and aliphatic polycarbonate diol.

The chain extending agent is not limited as far as it is a multifunctional active compound intramolecularly comprising two or more of functional groups reactive to end hydroxyl groups in aliphatic polycarbonate diol. A number of functional groups is not limited as far as two or more, difunctional ones are preferable. For example, diphenyl carbonate, diisocyanate, dicarboxylic anhydride and the like are included. Tri- or higher functional compounds may be used at a small amount. In place of diphenyl carbonate, carbonate compounds such as dimethyl carbonate, diethyl carbonate, dipropyl carbonate, diisopropyl carbonate, dibutyl carbonate, dimethyl carbonate and the like may be used. In addition, cyclic carbonate and dithiocarbonate compounds such as ethylene carbonate and the like may be used. Further, in replace of phenoxy groups in diphenyl carbonate, carbonyl compounds of nitrogen-containing compound residues such as imidazole, lactam and the like may be used.

In the above method, the low molecular weight aliphatic polycarbonate diol before its molecular weight is increased is preferably a commercial product but it is not limited. For example, when a special copolymer is required as aliphatic polycarbonate diol, specially prepared ones may be used.

In the above method, adjustment of the molecular weight of the obtained aliphatic polycarbonate diol may be carried out by varying a molecular weight of the raw material aliphatic polycarbonate diol and a mixing ratio between the aliphatic polycarbonate diol and the chain extending agent. In addition, adjustment can be carried out with a reaction period. The molecular weight of the obtained aliphatic polycarbonate diol becomes higher as a molecular weight of a starting raw material becomes higher and a mixing ratio of the chain extending agent becomes smaller. Conditions may be determined depending on the target molecular weight.

In the reaction method carried out as above, reaction conditions such as a reaction temperature, a reaction period, stirring conditions and the like are not limited as far as low molecular weight aliphatic polycarbonate diol having a molecular weight lower than the final molecular weight and a chain extending agent are mixed in a reactor. For example, a method is recommended in which molecular weight adjustment is carried out by dividing into multisteps of two or more steps. That is, it is preferable to adjust a molecular weight by carrying out a reaction at a predetermined mixing ratio for a predetermined period and measuring a molecular weight of the obtained aliphatic polycarbonate diol and, then, by further adding the chain extending agent when the measured molecular weight is lower than the target molecular weight or by further adding a raw material aliphatic polycarbonate diol when the measured molecular weight is higher than the target molecular weight, to proceed the reaction. By repeating the above processes, the accuracy in adjustment may be enhanced.

The end groups of the aliphatic polycarbonate diol may be either a hydroxyl group or a residue of the chain extending agent as far as the above molecular weight range is satisfied.

EXAMPLE

The present invention will be specifically explained below with referring to Examples and Comparative Examples but is not limited to them. Additionally, each measurement in the present invention was carried out according to the following manners.

(1) Reduced Viscosity of Thermoplastic Polyester Elastomer

Solutions of 0.05 g of thermoplastic polyester elastomer in 25 mL of a mixed solvent (phenol/tetrachloroethane=60/40) were subjected to measurements at 30° C. using an Ostward viscometer.

(2) Melting Point of Thermoplastic Polyester Elastomer (Tm)

Thermoplastic polyester elastomer dried under reduced pressure at 50° C. for 15 hours was subjected to measurements on a differential scanning carolimeter DSC-50 (manufactured by SHIMADZU CORPORATION) at a heating rate of 20° C./min. from room temperature. A temperature at an endotherm peak due to melting was defined as a melting point.

Additionally, measurement samples were subject to measurements by placing 10 mg in an aluminium pan (P/N 900793.901, manufactured by TA INSTRUMENTS) and by sealing it with an aluminium lid (P/N 900794.901, manufactured by TA INSTRUMENTS) under argon atmosphere.

(3) Tensile Strength and Elongation at Break of Thermoplastic Polyester Elastomer and its Compositions Tensile strength and elongation at break of thermoplastic polyester elastomer and its compositions were measured according to JIS K 6251. Test pieces of #3 dumbbell type were prepared by injection molding into flat plates having a dimension of 100 mm×100 mm×2 mm on an injection molding machine (model-SAV, manufactured by SANJO SEIKI Co., Ltd.) at a cylinder temperature of (Tm+20° C.) and at a mold temperature of 30° C. and by stamping the flat plates.

(4) Modulus in Flexure of Thermoplastic Polyester Elastomer and its Composition

Moduluses in flexure of thermoplastic polyester elastomer and its composition were measured according to ASTM D790.

(5) Heat-Aging Resistance (Retention Rate of Elongation at Break after a Heat-Aging Test)
<Preparation of Test Piece>

In a drum tumbler were placed 100 parts by weight of pellets made of thermoplastic polyester elastomer dried under reduced pressure at 100° C. for 8 hours prepared according to Examples 1-9, 1a-7a, 1b-13b, Comparative Examples 1-5, 1a-2a, or 1b-10b, 0.35 parts by weight of triglycidyl-tris(2-hydroxyethyl)isocyanurate as a multifunctional epoxy compound, 0.2 parts by weight of 2-methyl-4-ethylimidazol as a catalyst, and totally 1.2 parts by weight of (0.6 parts by weight of pentaerythritol tetrakis[3-3,5-di-ter-butyl-4-hydroxyphenylpropionate] and 0.6 parts by weight of N,N-hexane-1,6-diyl bis[3,5-di-ter-butyl-4-hydroxyphenylpropioneamide]) as a stabilizer, and they were mixed at room temperature for 30 minutes. The mixture was melt and kneaded at a temperature of (Tm+20° C.) and extruded in a strand by using a 40-mmϕ co-rotating double screw extruder with a vent. The strand was cut into chips with water cooling. The chips were dried under reduced pressure at 100° C. to obtain chips of the thermoplastic polyester elastomer composition.

Test pieces of #3 dumbbell type were prepared by injection molding the thermoplastic polyester elastomer into flat plates having a dimension of 100 mm×100 mm×2 mm on an injection molding machine (model-SAV, manufactured by SANJO SEIKI Co., Ltd.) at a cylinder temperature of (Tm+20° C.) and at a mold temperature of 30° C. and by stamping the flat plates.

Test pieces of #3 dumbbell type were prepared by drying at 100° C. and for 8 hours the pellets of the thermoplastic polyester elastomer composition obtained by compounding in Examples 10-22, and Comparative Examples 6-8 and, then, by injection molding the pellets into flat plates having a dimension of 100 mm×100 mm×2 mm on an injection molding machine (model-SAV, manufactured by SANJO SEIKI Co., Ltd.) at a cylinder temperature of (Tm+20° C.) and at a mold temperature of 30° C. and by stamping the flat plates.
<Dry-Heating Treatment, Evaluation of Ability to Retain Elongation at Break>

The test pieces obtained in the above were treated in a Gear type hot air dryer at 180° C. and for 1000 hours and, then, elongation at break was measured according to JIS K 6251. Also for the untreated test pieces, elongation at break was measured in the same manner to calculate a retention rate of the elongation at break due to dry-heating treatment.

(6) Water-Aging Resistance (Retention Rate of Elongation at Break after Water-Aging Test)
<Preparation of Test Piece>

Test pieces were prepared by the same manner described in the method for measuring heat-aging resistance.
<Boiling-Water Treatment, Evaluation of Ability to Retain Elongation at Break>

The test pieces were treated in boiling water at 100° C. and for 2 weeks and, then, elongation at break was measured according to JIS K 6251. Also for the untreated test pieces, elongation at break was measured in the same manner to calculate a retention rate of the elongation at break due to boiling-water treatment.

(7) Residual Strain after Repeating/10sile Tests
<Preparation of Test Piece>

Test pieces of JIS #1 dumbbell type were prepared by drying at 100° C. and for 8 hours the pellets of the thermoplastic polyester elastomer composition obtained by compounding in Examples 10-22, and Comparative Examples 6-8 and, then, by injection molding the pellets into flat plates having a dimension of 100 mm×100 mm×2 mm on an injection molding machine (model-SAV, manufactured by SANJO SEIKI Co., Ltd.) at a cylinder temperature of (Tm+20° C.) and at a mold temperature of 30° C. and by stamping the flat plates.
<Evaluation of Residual Strain>

The test piece of JIS #1 dumbbell type was set at a interval of 40 mm and pulled at a pull speed of 50 mm/min. to a strain of 30% (Chuck interval=65 mm) and, then, returned at a return speed of 50 mm/min. The strain (%) at a tensile stress of 0 MPa during returning is defined as residual strain.

(8) Average Chain Length and Block Order of Hard Segment and Soft Segment (when the Glycol Component in Polyester is Butanediol and the Glycol in Aliphatic Polycarbonate Diol is Aliphatic Diol Having a Carbon Number of 5-12)

<NMR Measurement>

Equipment: Fourier-Transform Nuclear Magnetic Resonance System (ADVANCE 500 manufactured by BRUKER)
  Solvent: Deuterium chloroform
  Concentration of sample solution: 3-5 vol %
  $^1$H resonance frequency: 500.13 MHz
  Flip angle of detection pulse: 45°
  Data sampling rate: 4 seconds
  Delay time: 1 second
  Integration number: 50-200 times
  Measurement temperature: Room temperature <Calculation Method>

The H-NMR integration value (arbitrary unit) of a peak for methylene groups of butane diol in a linkage of aromatic dicarboxylic acid-butane diol-aromatic dicarboxylic acid, which are next to oxygen atoms, was defined as A.

The H-NMR integration value (arbitrary unit) of a peak for a methylene group of butane diol in a linkage of aromatic dicarboxylic acid-butane diol-carbonic acid, which is next to an oxygen atom in proximity to carbonic acid, was defined as C.

The H-NMR integration value (arbitrary unit) of a peak for a methylene group of hexane diol in a linkage of aromatic dicarboxylic acid-aliphatic diol having a carbon number of 5 to 12-carbonic acid, which is next to an oxygen atom in proximity to aromatic dicarboxylic acid, was defined as B.

The H-NMR integration value (arbitrary unit) of a peak for methylene groups of aliphatic diol having a carbon number of 5 to 12 in a linkage of carbonic acid-aliphatic diol having a carbon number of 5 to 12-carbonic acid, which are next to an oxygen atom, was defined as D.

Hard segment average chain length (x) is defined as follows.

$$x=(((A/4)+(C/2))/((B/2)+(C/2)))\times 2$$

Soft segment average chain length (y) is defined as follows.

$$y=(((D/4)+(B/2))/((B/2)+(C/2)))\times 2.$$

Block order (B) is calculated by the following equation (1) by using x and y values obtained by the above equations. Smaller B values indicate higher block orders.

$$B=1/x+1/y \quad (1)$$

(9) Block Order-Retaining Ability

Measurement samples were prepared by placing 10 mg of thermoplastic polyester elastomer dried under reduced pressure at 50° C. and for 15 hours in an aluminium pan (P/N 900793.901, manufactured by TA INSTRUMENTS) and by sealing it with an aluminium lid (P/N 900794.901, manufactured by TA INSTRUMENTS). The measurement pan was heated on a differential scanning carolimeter DSC-50 (manufactured by SHIMADZU CORPORATION) under nitrogen atmosphere from room temperature to 300° C. at a heating rate of 20° C./min., maintained at 300° C. for 3 minutes and, then, the pan was removed to rapidly cool by dipping into liquid nitrogen. The sample was removed from liquid nitrogen to stand at room temperature for 30 minutes. The measurement pan was set on the differential scanning calorimeter and after 30 minutes at room temperature it was heated again from room temperature to 300° C. at a heating rate of 20° C./min. After the above procedures were repeated three times, a melting point difference (Tm1–Tm3) between a melting point obtained in the first cycle (Tm1) and a melting point obtained in the third cycle (Tm3) was calculated. The melting point difference was defined as block order-retaining ability. As the difference becomes smaller, block order-retaining ability is more excellent.

Based on the melting point difference, block order-retaining ability was judged using the following criteria:
⊚: Melting Point Difference is 0-lower than 30° C.
○: Melting Point Difference is 30-lower than 40° C.
Δ: Melting Point Difference is 40-lower than 50° C.
X: Melting Point Difference is 50° C. or higher.

(10) Molecular Weight of Aliphatic Polycarbonate Diol

An aliphatic polycarbonate diol sample was dissolved in deuterium chloroform ($CDCl_3$) and H-NMR of end groups were measured in the same manner described in (8) and its molecular weight was calculated by the following equation:

$$\text{Molecular weight}=1000000/((\text{end group concentration (eq/ton)})/2)$$

(11) Number-Average Molecular Weight (Mn) of Aromatic Polyester

A number-average molecular weight (Mn) of aromatic polyester was calculated according to the following equation using a reduced viscosity (ηsp/c) in the same manner as the above reduced viscosity measurement method for thermoplastic polyester elastomer.

$$\eta sp/c=1.019\times10^{-4}\times Mn^{0.8929}-0.0167$$

(12) Acid Value

A solution of 0.5 g of a thermoplastic polyester elastomer resin composition in 100 mL of benzylalcohol/chloroform (50/50 weight ratio) was titrated with a KOH solution in ethanol. Phenol Red was used as an indicator. Acid values are indicated in equivalent in 1 ton of resin (eq/ton).

(13) Melt Flow Rate (Abbreviation: MFR, Also Referred to as "Melt Flow Index")

A melt flow rate (MFR: g/10 minutes) for pellets of the thermoplastic polyester elastomer composition obtained in Examples and Comparative Examples was measured at 230° C. and at 2160 g according to a test method (A method) described in JIS K7210 (ASTM D1238). For measurement, a composition having a moisture content of 0.1 weight % or less was used. In addition, for pellets of the thermoplastic polyester elastomer compositions obtained in Examples 15, 16 and 21, melt flow rates were measured at 250° C.

Additionally, melt flow rates are preferably 2 g/10 minutes or less for blow molding and 15 g/10 minutes or less for extrusion molding.

[Method for Producing Aliphatic Polycarbonate Diol]

A Method for Producing Aliphatic Polycarbonate Diol (Molecular Weight 10000):

One hundred parts by weight of aliphatic polycarbonate diol (carbonate diol UH-CARB200, molecular weight 2000, 1,6-hexanediol type, manufactured by UBE INDUSTRIES, Ltd.) and 8.6 parts by weight of diphenyl carbonate were separately placed and they were reacted at 205° C. and at 130 Pa. After 2 hours, the resultant was cooled to obtain a polymer. Its molecular weight was 10000.

A Method for Producing Aliphatic Polycarbonate Diol (Molecular Weight 20000):

One hundred parts by weight of aliphatic polycarbonate diol (carbonate diol UH-CARB200, molecular weight 2000, 1,6-hexanediol, manufactured by UBE INDUSTRIES, Ltd.) and 9.6 parts by weight of diphenyl carbonate were separately placed and they were reacted at 205° C. and at 130 Pa. After 2 hours, the resultant was cooled to obtain a polymer. Its molecular weight was 20000.

A Method for Producing Aliphatic Copolycarbonate Diol (Molecular Weight 10000):

One hundred parts by weight of aliphatic copolycarbonate diol (carbonate diol T5652, molecular weight 2000, copolymer of 1,6-hexanediol and 1,5-pentanediol, amorphous, manufactured by ASAHI KASEI CHEMICALS CORPORATION) and 8.6 parts by weight of diphenyl carbonate were separately placed and they were reacted at 205° C. and at 130 Pa. After 2 hours, the resultant was cooled to obtain a polymer. Its molecular weight was 10000.

A Method for Producing of Aliphatic Polycarbonate Diol (Molecular Weight 85000):

One hundred parts by weight of aliphatic polycarbonate diol (carbonate diol UH-CARB200, molecular weight 2000, 1,6-hexanediol type, manufactured by UBE INDUSTRIES, Ltd.) and 10.7 parts by weight of diphenyl carbonate were separately placed and they were polymerized at 205° C. and at 130 Pa. After 2 hours and 45 minutes, the resultant was cooled to obtain a polymer. Its molecular weight was 85000.

A Method for Producing Aliphatic Polycarbonate Diol (Molecular Weight 12000):

One hundred parts by weight of aliphatic polycarbonate diol (carbonate diol UH-CARB200, molecular weight 2000, 1,6-hexanediol type, manufactured by UBE INDUSTRIES, Ltd.) and 8.9 parts by weight of diphenyl carbonate were separately placed and they were reacted at 205° C. and at 130 Pa. After 2 hours, the resultant was cooled to obtain a polymer. Its molecular weight was 12000.

A Method for Producing Aliphatic Polycarbonate Diol (Molecular Weight 33000):

One hundred parts by weight of aliphatic polycarbonate diol (carbonate diol UH-CARB200, molecular weight 2000, 1,6-hexanediol type, manufactured by UBE INDUSTRIES, Ltd.) and 10.0 parts by weight of diphenyl carbonate were separately placed and they were reacted at 205° C. and at 130 Pa. After 2 hours, the resultant was cooled to obtain a polymer. Its molecular weight was 33000.

A Method for Producing Aliphatic Polycarbonate Diol (Molecular Weight 18000):

One hundred parts by weight of aliphatic polycarbonate diol (carbonate diol UH-CARB200, molecular weight 2000, 1,6-hexanediol type, manufactured by UBE INDUSTRIES, Ltd.) and 9.5 parts by weight of diphenyl carbonate were separately placed and they were at 205° C. and at 130 Pa. After 2 hours, the resultant was cooled to obtain a polymer. Its molecular weight was 18000.

Below are Examples and Comparative Examples relating to the thermoplastic polyester elastomer of the present invention.

Example 1

One hundred parts by weight of polybutylene terephthalate (PBT) having a number-average molecular weight of 30000 and 43 parts by weight of the polycarbonate diol having a number-average molecular weight of 10000 prepared by the above method were stirred at 230-245° C., at 130 Pa for 1 hour. When it was confirmed resin became transparent, the resultant was removed and cooled to obtain Polymer A (thermoplastic polyester elastomer). Physical properties of the obtained polymer were measured and results are listed in Table 1. Polymer A obtained in this Example was good in any properties and had a high quality.

Example 2

One hundred parts by weight of polybutylene terephthalate (PBT) having a number-average molecular weight of 30000 and 43 parts by weight of the polycarbonate diol having a number-average molecular weight of 20000 prepared by the above method were stirred at 230-245° C., at 130 Pa and 1.5 hours. When it was confirmed resin became transparent, the resultant was removed and cooled to obtain Polymer B (thermoplastic polyester elastomer). Physical properties of the obtained polymer were measured and results are listed in Table 1. Polymer B obtained in this Example had a high quality equivalent to the quality of thermoplastic polyester elastomer obtained in Example 1.

Example 3

One hundred parts by weight of polybutylene terephthalate (PBT) having a number-average molecular weight of 30000 and 43 parts by weight of the aliphatic copolycarbonate diol having a number-average molecular weight of 10000 prepared by the above method were stirred at 230-245° C., at 130 Pa and for 1 hours. When it was confirmed resin became transparent, the resultant was removed and cooled to obtain Polymer C (thermoplastic polyester elastomer). Physical properties of the obtained polymer were measured and results are listed in Table 1.

Polymer C obtained in this Example had a high quality equivalent to the quality of the thermoplastic polyester elastomer obtained in Example 1. Comparing to a case where polycarbonate diol comprising 1,6-hexanediol was used as a soft segment, it was more excellent in low-temperature properties.

Example 4

One hundred parts by weight of polybutylene naphthalate (PBN) having a number-average molecular weight of 30000 and 43 parts by weight of the polycarbonate diol having a number-average molecular weight of 10000 prepared by the above method were stirred at 245-260° C., at 130 Pa and for 1 hours. When it was confirmed resin became transparent, the resultant was removed and cooled to obtain Polymer D (thermoplastic polyester elastomer). Physical properties of the obtained polymer were measured and results are listed in Table 1.

Polymer D obtained in this Example had a block order and a block order-retaining ability equivalent to those of the thermoplastic polyester elastomer obtained in Example 1 and had a higher melting point and a higher quality than those of the thermoplastic polyester elastomer obtained in Example 1.

Comparative Example 1

One hundred parts by weight of polybutylene terephthalate (PBT) having a number-average molecular weight of 30000 and 43 parts by weight of Polycarbonate diol C (carbonate diol UH-CARB200, molecular weight 2000, manufactured by UBE INDUSTRIES, Ltd.) were stirred at 230-245° C., at 130 Pa for 10 minutes. When it was confirmed resin became transparent, the resultant was removed and cooled to obtain Polymer E (thermoplastic polyester elastomer). Physical properties of the obtained polymer were measured and results are listed in Table 1.

Polymer E obtained in this Comparative Example had a poor block order and poor block order-retaining ability. Further, it had a low reduced viscosity and poor heat-aging resistance and had a low quality. Moreover, modulus in flexure could not be measured because its molecular weight was low.

Comparative Example 2

One hundred parts by weight of polybutylene terephthalate (PBT) having a number-average molecular weight of 30000 and 43 parts by weight of the polycarbonate diol having a number-average molecular weight of 85000 prepared by the above method were stirred at 230-245° C., at 130 Pa and for 5 hours. Obtained resin was still opaque. The resultant was removed and cooled to obtain Polymer F. Physical properties of the obtained Polymer F were measured and results are listed in Table 1.

The polymer obtained in this Comparative Example (thermoplastic polyester elastomer) had an excellent block order and an excellent block order-retaining ability. However, since compatibility between the hard segment and the soft segment was poor, it had poor mechanical properties such as tensile strength and the like and its properties greatly fluctuated and thus it was low quality.

Comparative Example 3

One hundred parts by weight of polybutylene terephthalate (PBT) having a number-average molecular weight of 2000 and 43 parts by weight of aliphatic copolycarbonate diol (carbonate diol T5652, molecular weight 2000, copolymer of 1,6-hexanediol and 1,5-pentanediol, amorphous, manufactured by ASAHI KASEI CHEMICALS CORPORATION) were stirred at 230-245° C., at 130 Pa and for 10 minutes. When it was confirmed resin became transparent, the resultant was removed and cooled to obtain Polymer G. Physical properties of the obtained polymer were measured and results are listed in Table 1.

Polymer G obtained in this Comparative Example (thermoplastic polyester elastomer) had a poor block order and poor block order-retaining ability and had a quality lower than that of the thermoplastic polyester elastomer obtained in Example 3. Moreover, modulus in flexure could not be measured because its molecular weight was low.

Comparative Example 4

For a thermoplastic polyester elastomer constituted with polybutylene terephthalate and polyoxytetramethylene glycol (polybutylene terephthalate units/polyoxytetramethylene glycol units=63.5/36.5 (weight ratio)), physical properties were measured and results are listed in Table 1. It is clear that heat-aging resistance was poor.

Comparative Example 5

For a thermoplastic polyester elastomer constituted with polybutylene terephthalate and polycaprolactone (polybutylene terephthalate units/polycaprolactone units=70/30 (weight ratio)), physical properties were measured and results are listed in Table 1. It is clear that water resistance was poor. Furthermore, off-odor was slightly felt when remelted.

Example 5

One hundred parts by weight of polybutylene terephthalate (PBT) having a number-average molecular weight of 38000 and 43 parts by weight of the polycarbonate diol having a number-average molecular weight of 12000 prepared by the above method were stirred at 230-245° C., at 130 Pa and for 1 hours. When it was confirmed resin became transparent, the resultant was removed and cooled to obtain Polymer H (thermoplastic polyester elastomer). Physical properties of the obtained polymer were measured and results are listed in Table 1.

The polymer obtained in this Example was good in any properties and had a high quality.

Example 6

One hundred parts by weight of polybutylene terephthalate (PBT) having a number-average molecular weight of 30000 and 43 parts by weight of the polycarbonate diol having a number-average molecular weight of 10000 prepared by the above method were stirred at 230-245° C., at 130 Pa and for 1 hours. When it was confirmed resin became transparent, the resultant was removed and cooled to obtain a polymer (thermoplastic polyester elastomer). The obtained polymer was placed in a batch dryer and nitrogen replacement was carried out and, then, solid phase polymerization was forwarded at 180° C. for 24 hours under reduced pressure at 130 Pa. Physical properties were measured and results are listed in Table 1.

The polymer obtained in this Example was good in any properties and had a high quality.

Example 7

One hundred parts by weight of polybutylene terephthalate (PBT) having a number-average molecular weight of 30000 and 75 parts by weight of the polycarbonate diol having a number-average molecular weight of 20000 prepared by the above method were stirred at 230-240° C., at 130 Pa and for 1 hours. When it was confirmed resin became transparent, the resultant was removed and cooled to obtain Polymer (thermoplastic polyester elastomer). Physical properties were measured and results are listed in Table 1.

The polymer obtained in this Example was good in any properties and had a high quality.

Example 8

One hundred parts by weight of polybutylene terephthalate (PBT) having a number-average molecular weight of 30000 and 100 parts by weight of the polycarbonate diol having a number-average molecular weight of 33000 prepared by the above method were stirred at 230-240° C., at 130 Pa and for 1 hours. When it was confirmed resin became transparent, the resultant was removed and cooled to obtain Polymer (thermoplastic polyester elastomer). Physical properties were measured and results are listed in Table 1.

The polymer obtained in this Example was good in any properties and had a high quality.

Example 9

One hundred parts by weight of polybutylene terephthalate (PBT) having a number-average molecular weight of 30000, 43 parts by weight of the polycarbonate diol having a number-average molecular weight of 18000 prepared by the above method and 0.0014 parts by weight of trimethylolpropane were stirred at 230-245° C., at 130 Pa and for 1 hours. When it was confirmed resin became transparent, the resultant was removed and cooled to obtain a polymer (thermoplastic polyester elastomer). Physical properties were measured and results are listed in Table 1.

The polymer obtained in this Example was good in any properties and had a high quality.

TABLE 1

|  | Ex. 1 | Ex. 2 | Ex. 3 | Ex. 4 |
|---|---|---|---|---|
| Reduced Viscosity (dL/g) | 1.20 | 1.25 | 1.15 | 1.20 |
| Melting Point (° C.) | 212 | 218 | 213 | 225 |
| Average Chain Length of Hard Segment (x) | 11 | 15 | 12 | 8 |
| Average Chain Length of Soft Segment (y) | 8 | 9 | 8 | 5 |
| Block Order (B) | 0.22 | 0.18 | 0.21 | 0.33 |
| Melting Point Difference (Tm1 − Tm3) (° C.) | 20 | 15 | 18 | 35 |
| Block Order-Retaining Ability | ⊚ | ⊚ | ⊚ | ○ |
| Tensile Strength at Break (MPa) | 32.0 | 33.0 | 31.0 | 34.2 |
| Modulus in Flexure (MPa) | 230 | 220 | 210 | 240 |
| Heat-Aging Resistance (Retention Rate: %) | 60 | 55 | 55 | 50 |
| Water-Aging Resistance (Retention Rate: %) | 97 | 98 | 95 | 95 |

|  | Comp. Ex. 1 | Comp. Ex. 2 | Comp. Ex. 3 | Comp. Ex. 4 | Comp. Ex. 5 |
|---|---|---|---|---|---|
| Reduced Viscosity (dL/g) | 0.50 | 0.85 | 0.45 | 1.79 | 1.40 |
| Melting Point (° C.) | 190 | 229 | 190 | 205 | 215 |
| Average Chain Length of Hard Segment (x) | 4 | 35 | 4 | 14 | 13 |
| Average Chain Length of Soft Segment (y) | 2 | 28 | 2 | 11 | 8 |
| Block Order (B) | 0.75 | 0.06 | 0.75 | 0.16 | 0.20 |
| Melting Point Difference (Tm1 − Tm3) (° C.) | 70 | 5 | 70 | 5 | 9 |
| Block Order-Retaining Ability | X | ⊚ | X | ⊚ | ⊚ |
| Tensile Strength at Break (MPa) | 5 | 10 | 3 | 33.2 | 35.0 |
| Modulus in Flexure (MPa) | — | 340 | — | 170 | 203 |
| Heat-Aging Resistance (Retention Rate: %) | 0 | 0 | 0 | 0 | 0 |
| Water-Aging Resistance (Retention Rate: %) | 75 | 70 | 70 | 98 | 5 |

|  | Ex. 5 | Ex. 6 | Ex. 7 | Ex. 8 | Ex. 9 |
|---|---|---|---|---|---|
| Reduced Viscosity (dL/g) | 1.21 | 1.35 | 1.20 | 1.25 | 1.22 |
| Melting Point (° C.) | 216 | 210 | 206 | 202 | 212 |
| Average Chain Length of Hard Segment (x) | 14 | 9 | 8 | 5 | 11 |
| Average Chain Length of Soft Segment (y) | 9 | 6 | 6 | 4 | 8 |
| Block Order (B) | 0.19 | 0.28 | 0.29 | 0.45 | 0.22 |
| Melting Point Difference (Tm1 − Tm3) (° C.) | 8 | 17 | 25 | 31 | 20 |
| Block Order-Retaining Ability | ⊚ | ⊚ | ⊚ | ○ | ⊚ |
| Tensile Strength at Break (MPa) | 33.0 | 34.0 | 29.5 | 28.1 | 31.0 |
| Modulus in Flexure (MPa) | 220 | 210 | 105 | 75 | 220 |
| Heat-Aging Resistance (Retention Rate: %) | 92 | 70 | 60 | 65 | 90 |
| Water-Aging Resistance (Retention Rate: %) | 95 | 97 | 95 | 95 | 97 |

Below are Examples and Comparative Examples relating to the thermoplastic polyester elastomer composition of the present invention.

Examples 10-22, Comparative Examples 6-8

One hundred parts by weight of the thermoplastic polyester elastomer obtained in Example 1, 2, 4, 5 or Comparative Example 1, the compound having one or more of groups reactive to the thermoplastic polyester elastomer shown in Table 2 and the antioxidant shown in Table 3 were compounded according to the compositions in Table 4 and 5, and 0.2 parts by weight of 2-methyl-4-ethylimidazol was further compounded as a catalyst and they were placed in a drum tumbler and they were mixed at room temperature for 30 minutes. The mixture was melt and kneaded at a temperature of (Tm+20° C.) and extruded in a strand by using a 40-mmϕ co-rotating double screw extruder with a vent. The strand was cut into chips with water cooling. The chips were dried under reduced pressure at 100° C. to obtain chips of the thermoplastic polyester elastomer composition of the present invention and the thermoplastic polyester elastomer compositions in Comparative Examples. Physical properties of the obtained compositions were measured and results are listed in Tables 4 and 5.

The values for melt flow rates of the thermoplastic polyester elastomer compositions in Comparative Examples 6-8 were too large for blow molding and extrusion molding (preferably 2 g/10 minutes or less for blow molding and 15 g/10 minutes or less for extrusion molding). Especially, the values were too large for forming flexible boots by using a press blow molding machine.

In addition, residual strains of the thermoplastic polyester elastomer compositions in Examples 10-22 were smaller than residual strains of the thermoplastic polyester elastomer compositions in Comparative Examples 6-8, demonstrating that strong molded products against repeating flex fatigue and the like can be obtained.

TABLE 2

| Abbreviation | Type | Compound |
|---|---|---|
| X1 | Monoepoxy Compound | Acryl Glycidyl Ether |
| X2 | Diepoxy Compound | Polypropylene Glycol Diglycidyl Ether |
| X3 | Diepoxy Compound | Condensation Polymer of Bisphenol A and Epichlorohydrin |

TABLE 2-continued

| Abbreviation | Type | Compound |
|---|---|---|
| X4 | Polyepoxy Compound | Triglycidyl Tris(2-hydroxyethyl) isocyanate |
| X5 | Polycarbodiimide | Stabaxol ® P (manufactured by Bayer AG) |

TABLE 3

| Abbreviation | Type | Compound |
|---|---|---|
| Y1 | Hindered Phenol-Type | Pentaerythritol Tetrakis[3-3,5-di-ter-butyl-4-hydroxyphenylpropionate] |
| Y2 | Hindered Amine-Type | N,N-Hexane-1,6-diyl Bis[3,5-di-ter-butyl-4-hydroxyphenylpropioneamide] |
| Y3 | Sulfur-Type | 2-Hydroxy-4-n-oxybenzophenone |
| Y4 | Phosphorus-Type | Tris(2,4-di-t-butylphenyl) Phosphite |
| Y5 | Amine-Type | 4,4'-Bis(4-α,α-dimethylbenzyl) diphenylamine |

TABLE 4

| | | | Ex. 10 | Ex. 11 | Ex. 12 | Ex. 13 | Ex. 14 | Ex. 15 | Ex. 16 | Ex. 17 |
|---|---|---|---|---|---|---|---|---|---|---|
| Composition (Part by Weight) | Type of Polyester Elastomer (Part by Weight) | | A (100) | A (100) | A (100) | A (100) | B (100) | D (100) | D (100) | H (100) |
| | Reactive group-containing Compound: X1 | | 0.5 | — | — | — | — | — | — | — |
| | Reactive group-containing Compound: X2 | | 0.9 | — | — | — | 0.9 | 0.9 | — | 0.9 |
| | Reactive group-containing Compound: X3 | | — | 1.1 | — | — | — | — | — | — |
| | Reactive group-containing Compound: X4 | | — | — | 0.7 | — | — | — | 0.7 | — |
| | Reactive group-containing Compound: X5 | | — | — | — | 3.0 | — | — | — | — |
| | Antioxidant: Y1 | | 0.5 | 0.5 | 0.5 | 0.5 | 0.5 | 0.5 | 0.5 | 0.5 |
| | Antioxidant: Y2 | | 0.5 | 0.5 | 0.5 | 0.5 | 0.5 | 0.5 | 0.5 | 0.5 |
| | Antioxidant: Y3 | | — | — | — | — | — | — | — | — |
| | Antioxidant: Y4 | | — | — | — | — | — | — | — | — |
| | Antioxidant: Y5 | | — | — | — | — | — | — | — | — |
| Acid Value of Composition (eq/ton) | | | 1 | 5 | 8 | 1 | 6 | 7 | 9 | 3 |
| Melt Flow Index (g/10 minutes) | | | 12 | 9 | 0.5 | 12 | 11 | 10 | 0.6 | 11 |
| Block Order-Retaining Ability | | | ◎ | ◎ | ◎ | ◎ | ◎ | ◎ | ◎ | ◎ |
| Tensile Strength at Break (MPa) | | | 33.0 | 32.0 | 33.0 | 32.0 | 34.0 | 34.2 | 34.2 | 33.0 |
| Modulus in Flexure (MPa) | | | 230 | 235 | 230 | 235 | 220 | 240 | 240 | 220 |
| Heat-Aging Resistance (Retention Rate: %) | | | 58 | 65 | 62 | 60 | 58 | 71 | 78 | 95 |
| Water-Aging Resistance (Retention Rate: %) | | | 90 | 89 | 91 | 100 | 92 | 93 | 91 | 92 |
| Residual Strain (%) | | | 8.8 | 8.7 | 7.9 | 8.9 | 8.8 | 8.8 | 8.0 | 8.3 |

TABLE 5

| | | | Ex. 18 | Ex. 19 | Ex. 20 | Ex. 21 | Ex. 22 | Comp. Ex. 6 | Comp. Ex. 7 | Comp. Ex. 8 |
|---|---|---|---|---|---|---|---|---|---|---|
| Composition (Part by Weight) | Type of Polyester Elastomer (Part by Weight) | | A (100) | A (100) | B (100) | D (100) | H (100) | A (100) | E (100) | H (100) |
| | Reactive group-containing Compound: X1 | | — | — | — | — | — | — | — | — |
| | Reactive group-containing Compound: X2 | | | | | | | | | |

TABLE 5-continued

|  | Ex. 18 | Ex. 19 | Ex. 20 | Ex. 21 | Ex. 22 | Comp. Ex. 6 | Comp. Ex. 7 | Comp. Ex. 8 |
|---|---|---|---|---|---|---|---|---|
| Reactive group-containing Compound: X3 | — | — | — | — | — | — | — | — |
| Reactive group-containing Compound: X4 | 0.4 | 0.4 | 0.4 | 0.4 | 0.4 | — | 0.4 | — |
| Reactive group-containing Compound: X5 | — | — | — | — | — | — | — | — |
| Antioxidant: Y1 | 0.5 | — | — | — | 0.5 | 0.5 | 0.5 | 0.5 |
| Antioxidant: Y2 | — | 0.5 | 0.5 | 0.5 | — | 0.5 | — | 0.5 |
| Antioxidant: Y3 | — | — | 0.3 | 0.3 | — | — | — | — |
| Antioxidant: Y4 | 0.5 | — | — | — | 0.5 | — | — | — |
| Antioxidant: Y5 | — | 0.2 | — | — | — | — | — | — |
| Acid Value of Composition (eq/ton) | 28 | 31 | 33 | 32 | 26 | 52 | 28 | 41 |
| Melt Flow Index (g/10 minutes) | 12 | 11 | 9 | 8 | 9 | 45 | 120 | 42 |
| Block Order-Retaining Ability | ◉ | ◉ | ◉ | ◉ | ◉ | ◉ | X | ◉ |
| Tensile Strength at Break (MPa) | 32.0 | 35.0 | 34.0 | 34.2 | 33.0 | 32.0 | 5.0 | 32.0 |
| Modulus in Flexure (MPa) | 235 | 230 | 220 | 240 | 220 | 230 | — | 210 |
| Heat-Aging Resistance (Retention Rate: %) | 58 | 65 | 62 | 76 | 96 | 38 | 0 | 47 |
| Water-Aging Resistance (Retention Rate: %) | 85 | 89 | 88 | 85 | 93 | 71 | 65 | 89 |
| Residual Strain (%) | 9.0 | 9.8 | 8.9 | 8.8 | 8.9 | 10.1 | 11.2 | 10.2 |

Below are Examples and Comparative Examples relating to the method for producing the thermoplastic polyester elastomer composition of the present invention.

Example 1a

Method for Producing High Molecular Weight Aliphatic Polycarbonate Diol

A Method for Producing Aliphatic Polycarbonate Diol (Molecular Weight 10000):

One hundred parts by weight of aliphatic polycarbonate diol (carbonate diol UH-CARB200, molecular weight 2000, 1,6-hexanediol type, manufactured by UBE INDUSTRIES, Ltd.) and 8.6 parts by weight of diphenyl carbonate were separately placed in a reactor. They were gradually heated to 205° C. Then, the pressure was gradually reduced and they were reacted at 130 Pa. After 2 hours, the resultant was cooled to obtain a polymer. Its molecular weight was 10000.

[Method for Producing Thermoplastic Polyester Elastomer]

One hundred parts by weight of polybutylene terephthalate (PBT) having a number-average molecular weight of 30000 and 43 parts by weight of the polycarbonate diol having a number-average molecular weight of 10000 prepared by the above method were placed in a reactor. They were stirred and gradually heated to 245° C. The pressure in the reactor was maintained at 130 Pa. After the inner temperature reached to 245° C., when it was confirmed resin became transparent after 1 hour, the resultant was removed and cooled to obtain a polymer (thermoplastic polyester elastomer). Physical properties of the obtained polymer were measured and results are listed in Table 6.

The thermoplastic polyester elastomer obtained in this Example was good in any properties and had a high quality.

Example 2a

According to the same manner as that in Example 1a except that the amount of diphenyl carbonate to be added was changed to 9.6 parts by weight, aliphatic polycarbonate diol whose number-average molecular weight was increased to 20000.

One hundred parts by weight of polybutylene terephthalate (PBT) having a number-average molecular weight of 30000 and 43 parts by weight of the polycarbonate diol having a number-average molecular weight of 20000 prepared by the above method were placed in a reactor. They were stirred and gradually heated to 245° C. The pressure in the reactor was maintained at 130 Pa. After the inner temperature reached to 245° C., when it was confirmed resin became transparent after 1.5 hours, the resultant was removed and cooled to obtain a polymer (thermoplastic polyester elastomer). Physical properties of the obtained polymer were measured and results are listed in Table 6.

The thermoplastic polyester elastomer obtained in this Example had a high quality equivalent to the quality of the thermoplastic polyester elastomer obtained in Example 1a.

Example 3a

According to the same manner as that in Example 1a except that the amount of diphenyl carbonate to be added was changed to 10.5 parts by weight and the reaction period was changed to 1.5 hours, aliphatic polycarbonate diol whose number-average molecular weight was increased to 50000.

One hundred parts by weight of polybutylene terephthalate (PBT) having a number-average molecular weight of 20000 and 43 parts by weight of the polycarbonate diol having a number-average molecular weight of 20000 prepared by the above method were placed in a reactor. They were stirred and gradually heated to 245° C. The pressure in the reactor was maintained at 130 Pa. After the inner temperature reached to 245° C., when it was confirmed resin became transparent after 1.5 hours, the resultant was removed and cooled to obtain a polymer (thermoplastic polyester elastomer). Physical properties of the obtained polymer were measured and results are listed in Table 6.

The thermoplastic polyester elastomer obtained in this Example had a high quality equivalent to the quality of the thermoplastic polyester elastomer obtained in Example 1a.

Example 4a

According to the same manner as that in Example 1a except that aliphatic copolycarbonate diol was changed to aliphatic copolycarbonate diol (carbonate diol T5652, molecular weight 2000, copolymer of 1,6-hexanediol and caprolactone, amorphous, manufactured by ASAHI KASEI CHEMICALS CORPORATION), aliphatic polycarbonate diol whose number-average molecular weight was increased to 10000.

One hundred parts by weight of polybutylene terephthalate (PBT) having a number-average molecular weight of 30000 and 43 parts by weight of the polycarbonate diol having a number-average molecular weight of 10000 prepared by the above method were placed in a reactor. They were stirred and gradually heated to 245° C. The pressure in the reactor was maintained at 130 Pa. After the inner temperature reached to 245° C., when it was confirmed resin became transparent after 1.5 hours, the resultant was removed and cooled to obtain a polymer (thermoplastic polyester elastomer). Physical properties of the obtained polymer were measured and results are listed in Table 6.

The thermoplastic polyester elastomer obtained in this Example had a high quality equivalent to the quality of the thermoplastic polyester elastomer obtained in Example 1a. Comparing to a case where polycarbonate diol comprising 1,6-hexanediol was used as a soft segment, it was more excellent in low-temperature properties.

Example 5a

One hundred parts by weight of polybutylene naphthalate (PBN: the naphthalate part is a 2,6-isomer) having a number-average molecular weight of 30000 and 43 parts by weight of the polycarbonate diol having a number-average molecular weight of 10000 prepared in Example 1a were placed in a reactor. They were stirred and gradually heated to 265° C. The pressure in the reactor was maintained at 130 Pa. After the inner temperature reached to 265° C., when it was confirmed resin became transparent after 1 hour, the resultant was removed and cooled to obtain a polymer (thermoplastic polyester elastomer). Physical properties of the obtained polymer were measured and results are listed in Table 6.

The thermoplastic polyester elastomer obtained in this Example had a block order and a block order-retaining ability equivalent to those of the thermoplastic polyester elastomer obtained in Example 1a and had a higher melting point and a higher quality than those of the thermoplastic polyester elastomer obtained in Example 1a.

Example 6a

Method for Producing High Molecular Weight Aliphatic Polycarbonate Diol

A Method for Producing Aliphatic Polycarbonate Diol (Molecular Weight 10000):
One hundred parts by weight of aliphatic polycarbonate diol (carbonate diol UH-CARB200, molecular weight 2000, 1,6-hexanediol type, manufactured by UBE INDUSTRIES, Ltd.) and 10.1 parts by weight of 4,4'-diphenylmethane diisocyanate were separately placed in a reactor. They were reacted at 180° C. under nitrogen atmosphere. After 2 hours, the resultant was cooled to obtain a polymer. Its molecular weight was 10000.
[Method for Producing Thermoplastic Polyester Elastomer]
One hundred parts by weight of polybutylene terephthalate (PBT) having a number-average molecular weight of 30000 and 43 parts by weight of the polycarbonate diol having a number-average molecular weight of 10000 prepared by the above method were placed in a reactor. They were stirred and gradually heated to 245° C. The pressure in the reactor was maintained at 130 Pa. After the inner temperature reached to 245° C., when it was confirmed resin became transparent after 1.5 hours, the resultant was removed and cooled to obtain a polymer (thermoplastic polyester elastomer). Physical properties of the obtained polymer were measured and results are listed in Table 6.

The thermoplastic polyester elastomer obtained in this Example was good in any properties and had a high quality.

Example 7a

Method for Producing High Molecular Weight Aliphatic Polycarbonate Diol

A Method for Producing Aliphatic Polycarbonate Diol (Molecular Weight 10000):
One hundred parts by weight of aliphatic polycarbonate diol (carbonate diol UH-CARB200, molecular weight 2000, 1,6-hexanediol type, manufactured by UBE INDUSTRIES, Ltd.) and 8.7 parts by weight of pyromellitic dianhydride were separately placed in a reactor. They were reacted at 205° C. and at 130 Pa. After 2 hours, the resultant was cooled to obtain a polymer. Its molecular weight was 10000.
[Method for Producing Thermoplastic Polyester Elastomer]
One hundred parts by weight of polybutylene terephthalate (PBT) having a number-average molecular weight of 30000 and 43 parts by weight of the polycarbonate diol having a number-average molecular weight of 10000 prepared by the above method were placed in a reactor. They were stirred and gradually heated to 245° C. The pressure in the reactor was maintained at 130 Pa. After the inner temperature reached to 245° C., when it was confirmed resin became transparent after 1.5 hours, the resultant was removed and cooled to obtain a polymer (thermoplastic polyester elastomer). Physical properties of the obtained polymer were measured and results are listed in Table 6.

Comparative Example 1a

One hundred parts by weight of polybutylene terephthalate (PBT) having a number-average molecular weight of 30000 and 43 parts by weight of polycarbonate diol C (carbonate diol UH-CARB200, molecular weight 2000, manufactured by UBE INDUSTRIES, Ltd.) were placed in a reactor. They were stirred and gradually heated to 245° C. The pressure in the reactor was maintained at 130 Pa. After the inner temperature reached to 245° C., when it was confirmed resin became transparent after 10 minutes, the resultant was removed and cooled to obtain a polymer (thermoplastic polyester elastomer). Physical properties of the obtained polymer were measured and results are listed in Table 6.

The thermoplastic polyester elastomer obtained in this Comparative Example had a poor block order and poor block order-retaining ability. Further, it had a low reduced viscosity and poor heat-aging resistance and had a low quality. Moreover, modulus in flexure could not be measured because its molecular weight was low.

Comparative Example 2a

One hundred parts by weight of polybutylene terephthalate (PBT) having a number-average molecular weight of 30000 and 43 parts by weight of p aliphatic copolycarbonate diol (carbonate diol T5652, molecular weight 2000, copolymer of 1,6-hexanediol and 1,5-pentanediol, amorphous, manufactured by ASAHI KASEI CHEMICALS CORPORATION) were placed in a reactor. They were stirred and gradually heated to 245° C. The pressure in the reactor was maintained at 130 Pa. After the inner temperature reached to 245° C., when it was confirmed resin became transparent after 10 minutes, the resultant was removed and cooled to obtain a polymer (thermoplastic polyester elastomer). Physical properties of the obtained polymer were measured and results are listed in Table 6.

The thermoplastic polyester elastomer obtained in this Comparative Example had a poor block order and poor block order-retaining ability and had a quality lower than that of the thermoplastic polyester elastomer obtained in Example 4a. Moreover, modulus in flexure could not be measured because its molecular weight was low.

TABLE 6

|  | Ex. 1a | Ex. 2a | Ex. 3a | Ex. 4a | Ex. 5a | Ex. 6a | Ex. 7a | Comp. Ex. 1a | Comp. Ex. 2a |
| --- | --- | --- | --- | --- | --- | --- | --- | --- | --- |
| Reduced Viscosity (dL/g) | 1.20 | 1.25 | 1.30 | 1.15 | 1.20 | 1.21 | 1.20 | 0.50 | 0.45 |
| Melting Point (° C.) | 212 | 218 | 215 | 213 | 225 | 211 | 212 | 190 | 190 |
| Average Chain Length of Hard Segment (x) | 11 | 15 | 13 | 12 | 8 | 10 | 11 | 4 | 4 |
| Average Chain Length of Soft Segment (y) | 8 | 9 | 9 | 8 | 5 | 7 | 8 | 2 | 2 |
| Block Order (B) | 0.22 | 0.18 | 0.19 | 0.21 | 0.33 | 0.24 | 0.22 | 0.75 | 0.75 |
| Block Order-Retaining Ability | ◉ | ◉ | ◉ | ◉ | ◉ | ◉ | ◉ | X | X |
| Tensile Strength (MPa) | 32.0 | 33.0 | 35.0 | 31.0 | 34.2 | 32.2 | 32.1 | 5 | 3 |
| Modulus in Flexure (MPa) | 230 | 220 | 230 | 210 | 240 | 230 | 230 | — | — |
| Heat-Aging Resistance (Retention Rate: %) | 60 | 55 | 55 | 60 | 60 | 55 | 60 | 0 | 0 |
| Water-Aging Resistance (Retention Rate: %) | 97 | 98 | 97 | 95 | 95 | 90 | 92 | 75 | 70 |

Example 1b

Adjustment of Molecular Weight of Aliphatic Polycarbonate Diol

One hundred parts by weight of aliphatic polycarbonate diol (carbonate diol UH-CARB200, molecular weight 2000, 1,6-hexanediol type, manufactured by UBE INDUSTRIES, Ltd.) and 8.6 parts by weight of diphenyl carbonate were separately placed in a reactor. They were gradually heated to 205° C. Then, the pressure was gradually reduced and they were reacted at 130 Pa. After 2 hours, the resultant was cooled to obtain a polymer. Its molecular weight was 10000.

[Method for Producing Thermoplastic Polyester Elastomer]

One hundred parts by weight of polybutylene terephthalate (PBT) having a number-average molecular weight of 30000 and having a hydroxyl end group concentration of 0 eq/ton and 43 parts by weight of the polycarbonate diol having a number-average molecular weight of 10000 prepared by the above method were placed in a reactor. They were stirred and gradually heated to 245° C. The pressure in the reactor was maintained at 130 Pa. After the inner temperature reached to 245° C., when it was confirmed resin became transparent after 1 hour, the resultant was removed and cooled to obtain a polymer (thermoplastic polyester elastomer). Physical properties of the obtained polymer were measured and results are listed in Table 7.

Examples 2b and 3b

According to the same method for adjusting a molecular weight of aliphatic polycarbonate diol in Example 1b except that the amount of diphenyl carbonate to be added was changed to 10.1 parts by weight or 6.4 parts by weight, respectively, aliphatic polycarbonate diols whose number-average molecular weights were increased to 27000 or 5000, respectively. According to the same manner as that in Example 1b except that aliphatic polycarbonate diols having the above molecular weight were used, thermoplastic polyester elastomers of Examples 2b and 3b were obtained. Results are listed in Table 7.

The thermoplastic polyester elastomer obtained in this Example had a high quality equivalent to the quality of the thermoplastic polyester elastomer obtained in Example 1b.

Comparative Example 1b

According to the same manner as the method for adjusting a molecular weight of aliphatic polycarbonate diol in Example 1b except that the amount of diphenyl carbonate to be used was changed to 3.7 parts by weight and the aliphatic polycarbonate diol whose number-average molecular weight was adjusted to 32000 in the same manner as that in Example 1b was used, the thermoplastic polyester elastomer of Comparative Example 1b was obtained. Results were listed in Table 8.

Since the thermoplastic polyester elastomer obtained in this Comparative Example had poor compatibility between the hard segment and the soft segment, it had poor mechanical properties such as tensile strength and the like and its properties greatly fluctuated and thus it was low quality.

Comparative Example 2b

According to the same manner as that in Example 1b except that commercial aliphatic polycarbonate diol having a molecular weight of 2000 without carrying out the method for adjusting a molecular weight of aliphatic polycarbonate diol, the thermoplastic polyester elastomer in Comparative Example 2b was obtained. Results are listed in Table 8.

The thermoplastic polyester elastomer obtained in this Comparative Example had a poor block order and poor block order-retaining ability. Further, it had a low reduced viscosity and poor heat-aging resistance and had a low quality. Moreover, modulus in flexure could not be measured because its molecular weight was low.

Examples 4b-12b

According to the same manner as that in Example 1b except that the hydroxyl end group concentration of PBT and the molecular weight of aliphatic polycarbonate diol were changed to those described in Table 7, the thermoplastic polyester elastomers in Example 4b-12b were obtained. Results are listed in Table 7.

All of the thermoplastic polyester elastomers in these Examples had a high quality equivalent to the quality of the thermoplastic polyester elastomer obtained in Example 1b.

Comparative Examples 3b-8b

According to the same manner as that in Example 1b except that the hydroxyl end group concentration of PBT and the molecular weight of aliphatic polycarbonate diol were changed to those described in Table 8, the thermoplastic polyester elastomers in Comparative Examples 3b-8b were obtained. Results are listed in Table 8.

Since all of the thermoplastic polyester elastomers obtained in Comparative Examples 3b, 5b and 7b had poor compatibility between the hard segment and the soft segment similar to the thermoplastic polyester elastomer obtained in Comparative Example 1b, they had poor mechanical properties such as tensile strength and the like and its properties greatly fluctuated and thus it was low quality. In addition, all of the thermoplastic polyester elastomers obtained in Comparative Examples 4b, 6b and 8b had a poor block order and block order-retaining ability similar to the thermoplastic polyester elastomer obtained in Comparative Example 2b. Further, it had a low reduced viscosity and poor heat-aging resistance and had a low quality. Moreover, modulus in flexure could not be measured because its molecular weight was low.

The hydroxyl end group concentrations of PBT used in Examples 4b-12b and Comparative Examples 3b-8b were adjusted by changing the production conditions for PBT. The molecular weights of aliphatic polycarbonate diol were adjusted by optimizing a mixing ratio between a raw material aliphatic polycarbonate diol and a chain extending agent and the reaction conditions. In this case, fine adjustments of the molecular weights were carried out by dividing into multitask of two or more steps depending on requirements. That is, the molecular weights were adjusted by carrying out a reaction at a predetermined mixing ratio for a predetermined period and measuring a molecular weight of the obtained aliphatic polycarbonate diol and, then, by further adding the chain extending agent when the measured molecular weight is lower than the target molecular weight or by further adding a raw material aliphatic polycarbonate diol when the measured molecular weight is higher than the target molecular weight, to proceed the reaction.

Example 13b

One hundred parts by weight of polybutylene naphthalate (PBN: the naphthalate part is a 2,6-isomer) having a number-average molecular weight of 30000 and having a hydroxyl end group concentration of 10 eq/ton and 43 parts by weight of the polycarbonate diol having a number-average molecular weight of 10000 prepared by the above method were placed in a reactor. They were stirred and gradually heated to 265° C. The pressure in the reactor was maintained at 130 Pa. After the inner temperature reached to 265° C., when it was confirmed resin became transparent after 1 hour, the resultant was removed and cooled to obtain a polymer (thermoplastic polyester elastomer). Physical properties of the obtained polymer were measured and results are listed in Table 9.

The thermoplastic polyester elastomer obtained in this Example was good in any properties and had a high quality.

Comparative Examples 9b and 10b

According to the same manner as that in Example 13b except that the molecular weight of aliphatic polycarbonate diol was changed to 2000 or 40000, respectively to obtain the thermoplastic polyester elastomers in Comparative Examples 9b and 10b. Results are listed in Table 9.

The thermoplastic polyester elastomer obtained in Comparative Example 9b had a block order and block order-retaining ability. Further, it had a low reduced viscosity and poor heat-aging resistance and had a low quality.

Since the thermoplastic polyester elastomer obtained in Comparative Example 10b had poor compatibility between the hard segment and the soft segment, it had poor mechanical properties such as tensile strength and the like and its properties greatly fluctuated and thus it was low quality.

For all of the aliphatic polycarbonate diols used in Examples and Comparative Examples, the end groups comprises hydroxyl end groups at 85-100% and remaining 0-15% were residues of the chain extending agent.

Figure 2:
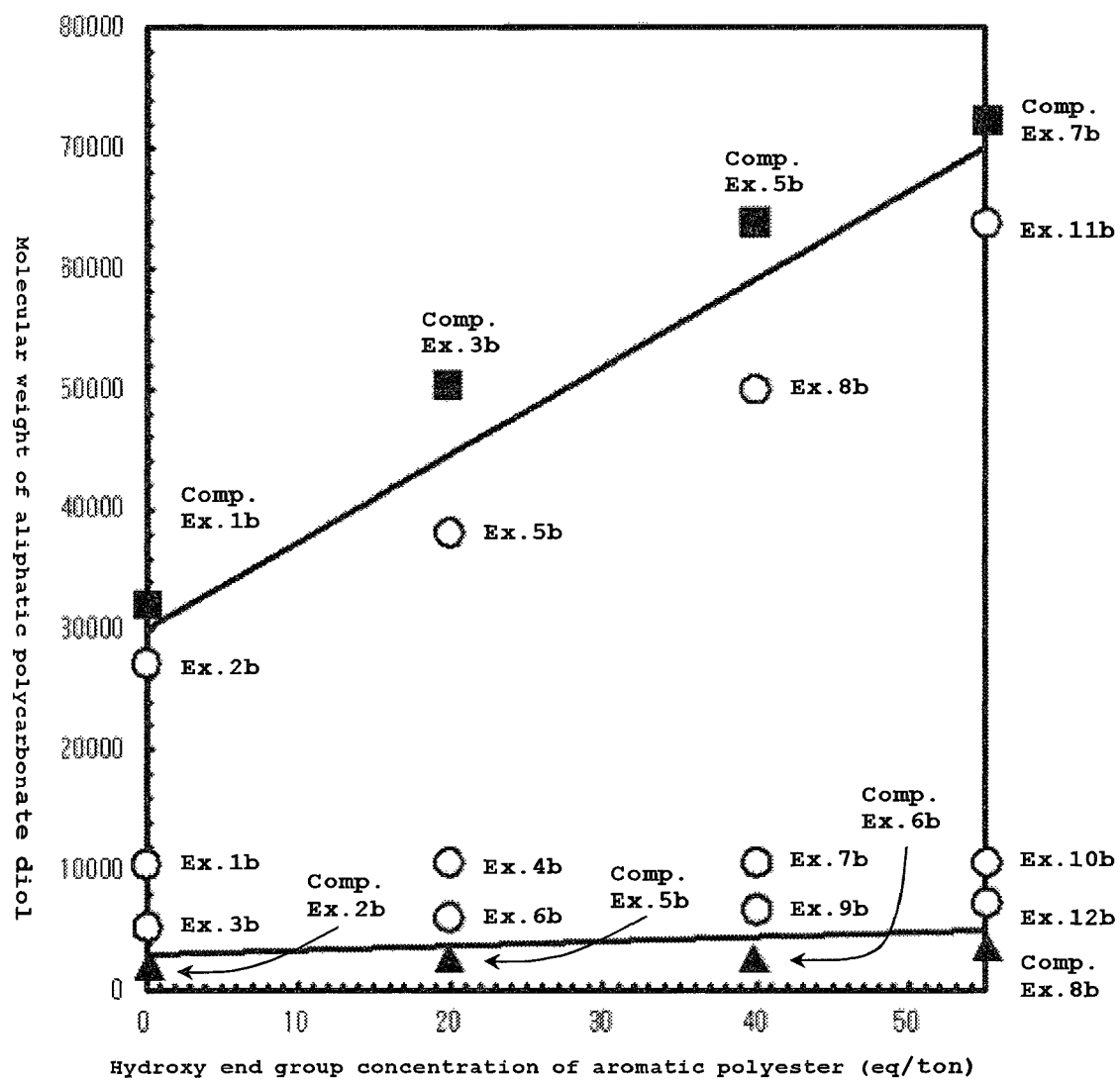
FIG. 2 A graphical representation plotting the thermoplastic elastomers obtained in Examples 1b-12b and Comparative Examples 1b-8b on a graphical representation showing a relationship between a hydroxyl end group concentration of PBT and a molecular weight of an aliphatic polycarbonate diol.

Properties of the thermoplastic elastomers obtained in Examples 1b-12b and Comparative Examples 1b-8b are plotted on a map for a hydroxyl end group concentration of PBT versus a molecular weight of aliphatic polycarbonate diol, which is shown in FIG. 2. A black square (■) represents one having poor compatibility between the hard segment and the soft segment. A black triangle (▲) represents one having a poor block order and block order-retaining ability. A white circle (○) represents one satisfying the both properties. Additionally, lines in the figure show a preferred molecular weight range in the present invention.

It can be recognized that use of aliphatic polycarbonate diol having a molecular weight in a range suitable for a hydroxyl end group concentration of PBT which is a hard segment component is an important factor for satisfying the both properties mentioned above.

TABLE 7

|  | Ex. 1b | Ex. 2b | Ex. 3b | Ex. 4b | Ex. 5b | Ex. 6b |
| --- | --- | --- | --- | --- | --- | --- |
| Concentration of Hydroxyl End Group of PBT (eq/ton) | 0 | 0 | 0 | 20 | 20 | 20 |
| Molecular Weight of Aliphatic Polycarbonate Diol | 10000 | 27000 | 5000 | 10000 | 38000 | 6000 |
| Properties of Polyester Elastomer |  |  |  |  |  |  |
| Reduced Viscosity (dL/g) | 1.20 | 1.15 | 1.08 | 1.21 | 1.16 | 1.09 |

TABLE 7-continued

|  |  |  |  |  |  |  |
|---|---|---|---|---|---|---|
| Melting Point (° C.) | 213 | 219 | 212 | 214 | 218 | 208 |
| Average Chain Length of Hard Segment (x) | 11 | 16 | 11 | 12 | 15 | 9 |
| Average Chain Length of Soft Segment (y) | 8 | 10 | 8 | 9 | 9 | 6 |
| Block Order (B) | 0.22 | 0.16 | 0.22 | 0.19 | 0.18 | 0.28 |
| Block Order-Retaining Ability | ◎ | ◎ | ○ | ◎ | ◎ | ○ |
| Tensile Strength (MPa) | 32.0 | 31.0 | 30.0 | 33.0 | 31.5 | 30.5 |
| Modulus in Flexure (MPa) | 230 | 210 | 200 | 240 | 220 | 210 |
| Heat-Aging Resistance (Retention Rate: %) | 60 | 60 | 55 | 60 | 60 | 50 |
| Water-Aging Resistance (Retention Rate: %) | 97 | 95 | 94 | 96 | 95 | 90 |

|  | Ex. 7b | Ex. 8b | Ex. 9b | Ex. 10b | Ex. 11b | Ex. 12b |
|---|---|---|---|---|---|---|
| Concentration of Hydroxyl End Group of PBT (eq/ton) | 40 | 40 | 40 | 55 | 55 | 55 |
| Molecular Weight of Aliphatic Polycarbonate Diol | 10000 | 50000 | 6500 | 10000 | 63000 | 7000 |
| Properties of Polyester Elastomer |  |  |  |  |  |  |
| Reduced Viscosity (dL/g) | 1.15 | 1.19 | 1.12 | 1.15 | 1.25 | 1.10 |
| Melting Point (° C.) | 211 | 216 | 207 | 210 | 216 | 205 |
| Average Chain Length of Hard Segment (x) | 10 | 13 | 9 | 10 | 13 | 7 |
| Average Chain Length of Soft Segment (y) | 7 | 9 | 5 | 7 | 9 | 5 |
| Block Order (B) | 0.24 | 0.19 | 0.31 | 0.24 | 0.19 | 0.34 |
| Block Order-Retaining Ability | ◎ | ◎ | ○ | ◎ | ◎ | ○ |
| Tensile Strength (MPa) | 31.0 | 32.0 | 31.0 | 31.5 | 33.5 | 31.0 |
| Modulus in Flexure (MPa) | 220 | 230 | 210 | 220 | 240 | 210 |
| Heat-Aging Resistance (Retention Rate: %) | 55 | 60 | 50 | 55 | 60 | 50 |
| Water-Aging Resistance (Retention Rate: %) | 96 | 98 | 90 | 95 | 97 | 90 |

TABLE 8

|  | Comp. Ex. 1b | Comp. Ex. 2b | Comp. Ex. 3b | Comp. Ex. 4b |
|---|---|---|---|---|
| Concentration of Hydroxyl End Group of PBT (eq/ton) | 0 | 0 | 20 | 20 |
| Molecular Weight of Aliphatic Polycarbonate Diol | 32000 | 2000 | 50000 | 3000 |
| Properties of Polyester Elastomer |  |  |  |  |
| Reduced Viscosity (dL/g) | 0.90 | 0.50 | 0.85 | 0.60 |
| Melting Point (° C.) | 228 | 190 | 229 | 185 |
| Average Chain Length of Hard Segment (x) | 30 | 4 | 35 | 3.5 |
| Average Chain Length of Soft Segment (y) | 23 | 2 | 28 | 1.5 |
| Block Order (B) | 0.08 | 0.75 | 0.06 | 0.95 |
| Block Order-Retaining Ability | ◎ | X | ◎ | X |
| Tensile Strength (MPa) | 10 | 5 | 10 | 6 |
| Modulus in Flexure (MPa) | 330 | — | 340 | — |
| Heat-Aging Resistance (Retention Rate: %) | 0 | 0 | 0 | 0 |
| Water-Aging Resistance (Retention Rate: %) | 70 | 75 | 70 | 70 |

|  | Comp. Ex. 5b | Comp. Ex. 6b | Comp. Ex. 7b | Comp. Ex. 8b |
|---|---|---|---|---|
| Concentration of Hydroxyl End Group of PBT (eq/ton) | 40 | 40 | 55 | 55 |
| Molecular Weight of Aliphatic Polycarbonate Diol | 64000 | 3000 | 72000 | 4000 |
| Properties of Polyester Elastomer |  |  |  |  |
| Reduced Viscosity (dL/g) | 0.87 | 0.55 | 0.82 | 0.58 |
| Melting Point (° C.) | 227 | 192 | 229 | 193 |
| Average Chain Length of Hard Segment (x) | 28 | 4 | 35 | 4.5 |
| Average Chain Length of Soft Segment (y) | 21 | 2 | 28 | 2.5 |
| Block Order (B) | 0.08 | 0.75 | 0.06 | 0.62 |
| Block Order-Retaining Ability | ◎ | X | ◎ | X |
| Tensile Strength (MPa) | 20 | 4 | 10 | 6 |
| Modulus in Flexure (MPa) | 340 | — | 350 | — |
| Heat-Aging Resistance (Retention Rate: %) | 0 | 0 | 0 | 0 |
| Water-Aging Resistance (Retention Rate: %) | 70 | 70 | 68 | 70 |

TABLE 9

|  | Ex. 13b | Comp. Ex. 9b | Comp. Ex. 10b |
|---|---|---|---|
| Concentration of Hydroxyl End Group of PBN (eq/ton) | 10 | 10 | 10 |

TABLE 9-continued

|  | Ex. 13b | Comp. Ex. 9b | Comp. Ex. 10b |
|---|---|---|---|
| Molecular Weight of Aliphatic Polycarbonate Diol | 10000 | 2000 | 40000 |
| Properties of Polyester Elastomer Reduced Viscosity (dL/g) | 1.20 | 0.50 | 0.88 |
| Melting Point (° C.) | 225 | 210 | 243 |
| Average Chain Length of Hard Segment (x) | 8 | 4 | 34 |
| Average Chain Length of Soft Segment (y) | 5 | 2 | 26 |
| Block Order (B) | 0.33 | 0.75 | 0.07 |
| Block Order-Retaining Ability | ○ | X | ◎ |
| Tensile Strength (MPa) | 34.2 | 5 | 10 |
| Modulus in Flexure (MPa) | 240 | — | 400 |
| Heat-Aging Resistance (Retention Rate: %) | 60 | 0 | 0 |
| Water-Aging Resistance (Retention Rate: %) | 95 | 70 | 70 |

The thermoplastic polyester elastomer and its compositions, and a method for producing it according to the present invention have been explained above referring to Examples but the present invention is not limited to the structures described in the above Examples and the structures may be appropriately modified by appropriately combining structures described in respective Examples and the like as far as not to deviate from the spirit of the present invention.

INDUSTRIAL APPLICABILITY

The thermoplastic polyester elastomer of the present invention and its compositions maintain characteristics of polyester polycarbonate-type elastomer, in which heat resistance is good and heat-aging resistance, water resistance, a low-temperature property and the like are excellent and its block order and block order-retaining ability are improved. Since the block order is high, reduction in heat resistance induced by lowering a melting point is suppressed and, mechanical properties such as hardness, tensile strength, elasticity and the like are enhanced. In addition, since fluctuation in the block order at a time of molding is suppressed due to improved block order-retaining ability, uniformity of product quality can be enhanced. In addition, by compounding 0.01-20 parts by weight of a compound having one or more of reactive groups, effects of improving heat-aging resistance, water resistance and residual strain and a melt flow rate adequate for blow molding and extrusion molding can be achieved. Further, since recycle properties are enhanced due to the above characteristics, environment burden and cost may be reduced. Therefore, as described above, the thermoplastic polyester elastomer of the present invention may be used in various molding materials including fibers, films, sheets and the like due to the above mentioned excellent characteristics and advantages. Moreover, it is suitable for molding materials such as elastic threads and boots, gears, tubes, packings, and is useful, for example, in applications for automobile, home electronics parts and the like in which heat-aging resistance, water resistance and low-temperature properties are demanded, and specifically, in applications for joint boots, wire coating materials and the like. Especially, it may be preferably used as raw materials for parts which are demanded to have high heat resistance such as joint boots, wire coating materials used on the periphery of automobile engines. Thus, the present invention greatly contributes to industry.

The invention claimed is:

1. A thermoplastic polyester elastomer comprising a hard segment which consists of polyester constituted with aromatic dicarboxylic acid and aliphatic or alicyclic diol and a soft segment which consists of aliphatic polycarbonate, wherein the aliphatic polycarbonate is an aliphatic polycarbonate constituted with aliphatic diol residues having a carbon number of 2-12 and carbonate bonds or an aliphatic polycarbonate prepared by copolymerizing 40 parts by weight or lower of glycols selected from diol dimers, hydrogenated diol dimers and their modifications; dicarboxylic acids selected from dimer acids and hydrogenated dimer acids; polyesters or oligoesters constituted with aliphatic, aromatic, or alicyclic dicarboxylic acids and glycols; polyesters or oligoesters constituted with ε-caprolactone; polyalkylene glycols or oligoalkylene glycols selected from polytetramethylene glycol and polyoxyethylene glycol with respect to 100 parts by weight of the aliphatic polycarbonate segments, wherein hard segment-constituting units and soft segment-constituting units being directly connected with ester bonds or carbonate bonds, and wherein when melting points of the thermoplastic polyester elastomer are measured with a differential scanning calorimeter in three cycles wherein a temperature is raised from room temperature to 300° C. at a heating rate of 20° C./min., maintained at 300° C. for 3 minutes and lowered to room temperature at a cooling rate of 100° C./min., a melting point difference (Tm1−Tm3) between a melting point obtained in the first cycle (Tm1) and a melting point obtained in the third cycle (Tm3) is 0-50° C., and a tensile strength at break is 15-100 MPa.

2. The thermoplastic polyester elastomer according to claim 1, wherein the hard segment comprises polybutylene terephthalate units and the melting points of the thermoplastic polyester elastomer are 200-225° C.

3. The thermoplastic polyester elastomer according to claim 1, wherein the hard segment comprises polybutylene naphthalate units and the melting points of the thermoplastic polyester elastomer are 215-240° C.

4. The thermoplastic polyester elastomer according to claim 1, wherein when an average chain length of the hard segment is defined as x and an average chain length of the soft segment is defined as y by calculating with nuclear magnetic resonance (NMR), the average chain length of the hard segment (x) is 5-20 and a block order (B) calculated with the following equation (1):

$$B = 1/x + 1/y \quad (1)$$

is 0.11-0.45.

5. The thermoplastic polyester elastomer according to claim 1, which is prepared by reacting the polyester constituted with aromatic dicarboxylic acid and aliphatic or alicyclic diol and aliphatic polycarbonate diol having a molecular weight of 5000-80000 in a molten state.

6. A thermoplastic polyester elastomer composition comprising 100 parts by weight of a thermoplastic polyester elastomer comprising a hard segment which consists of polyester constituted with aromatic dicarboxylic acid and aliphatic or alicyclic diol and a soft segment which consists of aliphatic polycarbonate, wherein the aliphatic polycarbonate is an aliphatic polycarbonate constituted with aliphatic diol residues having a carbon number of 2-12 and carbonate bonds or an aliphatic polycarbonate prepared by copolymerizing 40 parts by weight or lower of glycols selected from diol dimers, hydrogenated diol dimers and their modifications; dicarboxylic acids selected from dimer acids and hydrogenated dimer acids; polyesters or oligoesters constituted with aliphatic, aromatic, or alicyclic dicarboxylic acids and glycols; polyesters or oligoesters constituted with ε-caprolactone; polyalkylene glycols or oligoalkylene glycols selected from polytetramethylene glycol and polyoxyethylene glycol with respect to 100 parts by weight of the aliphatic polycarbonate segments, wherein hard segment-constituting units and soft segment-constituting units being directly connected with ester bonds or carbonate bonds, and wherein when melting points of the thermoplastic polyester elastomer are measured with a differential scanning calorimeter in three cycles wherein a temperature is raised from room temperature to 300° C. at a heating rate of 20° C./min., maintained at 300° C. for 3 minutes and lowered to room temperature at a cooling rate of 100° C./min., a melting point difference (Tm1−Tm3) between a melting point obtained in the first cycle (Tm1) and a melting point obtained in the third cycle (Tm3) is 0-50° C., and a tensile strength at break is 15-100 MPa and 0.01-20 parts by weight of a compound having one or more of groups reactive to the thermoplastic polyester elastomer.

7. The thermoplastic polyester elastomer composition according to claim 6, wherein the hard segment in the thermoplastic polyester elastomer comprises polybutylene terephthalate units and the melting points of the thermoplastic polyester elastomer are 200-225° C.

8. The thermoplastic polyester elastomer composition according to claim 6, wherein the hard segment in the thermoplastic polyester elastomer comprises polybutylene naphthalate units and the melting points of the thermoplastic polyester elastomer are 215-240° C.

9. The thermoplastic polyester elastomer composition according to claim 6, wherein when an average chain length of the hard segment is defined as x and an average chain length of the soft segment is defined as y by calculating with nuclear magnetic resonance (NMR), the average chain length of the hard segment in the thermoplastic polyester elastomer (x) is 5-20 and a block order (B) calculated with the following equation (1):

$$B = 1/x + 1/y \quad (1)$$

is 0.11-0.45.

10. The thermoplastic polyester elastomer composition according to claim 6, wherein the thermoplastic polyester elastomer is prepared by reacting the polyester constituted with aromatic dicarboxylic acid and aliphatic or alicyclic diol and aliphatic polycarbonate diol having a molecular weight of 5000-80000 in a molten state.

11. A molded product comprising the thermoplastic polyester elastomer composition according to claim 6.

12. A method for producing a thermoplastic polyester elastomer comprising a hard segment which consists of polyester constituted with aromatic dicarboxylic acid and aliphatic or alicyclic diol and a soft segment which consists of aliphatic polycarbonate, wherein the aliphatic polycarbonate is an aliphatic polycarbonate constituted with aliphatic diol residues having a carbon number of 2-12 and carbonate bonds or an aliphatic polycarbonate prepared by copolymerizing 40 parts by weight or lower of glycols selected from diol dimers, hydrogenated diol dimers and their modifications; dicarboxylic acids selected from dimer acids and hydrogenated dimer acids; polyesters or oligoesters constituted with aliphatic, aromatic, or alicyclic dicarboxylic acids and glycols; polyesters or oligoesters constituted with ε-caprolactone; polyalkylene glycols or oligoalkylene glycols selected from polytetramethylene glycol and polyoxyethylene glycol with respect to 100 parts by weight of the aliphatic polycarbonate segments, wherein hard segment-constituting units and soft segment-constituting units being directly connected with ester bonds or carbonate bonds, wherein an aliphatic polycarbonate diol whose molecular weight has been previously increased with a chain extending agent is used.

13. The method for producing a thermoplastic polyester elastomer according to claim 12, wherein the aliphatic polycarbonate diol whose molecular weight has been previously increased has a number-average molecular weight of 5000-80000.

14. The method for producing a thermoplastic polyester elastomer according to claim 12, which comprises reacting the polyester constituted with aromatic dicarboxylic acid and aliphatic or alicyclic diol and the aliphatic polycarbonate diol whose molecular weight has been previously increased in a molten state.

15. A method for producing a thermoplastic polyester elastomer comprising a hard segment which consists of polyester constituted with aromatic dicarboxylic acid and aliphatic or alicyclic diol and a soft segment which consists of aliphatic polycarbonate, wherein the aliphatic polycarbonate is an aliphatic polycarbonate constituted with aliphatic diol residues having a carbon number of 2-12 and carbonate bonds or an aliphatic polycarbonate prepared by copolymerizing 40 parts by weight or lower of glycols selected from diol dimers, hydrogenated diol dimers and their modifications; dicarboxylic acids selected from dimer acids and hydrogenated dimer acids; polyesters or oligoesters constituted with aliphatic, aromatic, or alicyclic dicarboxylic acids and glycols; polyesters or oligoesters constituted with ε-caprolactone; polyalkylene glycols or oligoalkylene glycols selected from polytetramethylene glycol and polyoxyethylene glycol with respect to 100 parts by weight of the aliphatic polycarbonate segments, wherein hard segment-constituting units and soft segment-constituting units being directly connected with ester bonds or carbonate bonds, which comprises reacting in a molten state polyester constituted with aromatic dicarboxylic acid and aliphatic or alicyclic diol which has a hydroxyl end group concentration of 0-55 eq/ton and aliphatic polycarbonate diol having a molecular weight in the following range:

when the lower limit of the molecular weight of the aliphatic polycarbonate diol is set to be equal to or higher than molecular weights on a line connecting a point of 3000 at a hydroxyl end group concentration of 0 eq/ton for polyester constituted with aromatic dicarboxylic acid and aliphatic or alicyclic diol and a point of 5000 at a hydroxyl end group concentration of 55 eq/ton for polyester constituted with aromatic dicarboxylic acid and aliphatic or alicyclic diol; and the upper limit of the molecular weight of the aliphatic polycarbonate diol is set to be equal to or lower than molecular weights on a line connecting a point of 30000 at a hydroxyl end group concentration of 0 eq/ton for polyester constituted with aromatic dicarboxylic acid and aliphatic or alicyclic diol and a point of 70000 at a hydroxyl end group concentration of 55 eq/ton for polyester constituted with aromatic dicarboxylic acid and aliphatic or alicyclic diol, the molecular weight of the aliphatic polycarbonate is on or between the two lines.

16. The method for producing a thermoplastic polyester elastomer according to claim 15, wherein the molecular weight of the aliphatic polycarbonate diol is adjusted by previously increasing with a chain extending agent.

* * * * *